US009886696B2

(12) United States Patent
Roeding et al.

(10) Patent No.: US 9,886,696 B2
(45) Date of Patent: Feb. 6, 2018

(54) METHOD AND SYSTEM FOR PRESENCE DETECTION

(75) Inventors: Cyriac Roeding, Portola Valley, CA (US); Aaron T. Emigh, Incline Village, NV (US)

(73) Assignee: shopkick, Inc., Redwood City, CA (US)

( * ) Notice: Subject to any disclaimer, the term of this patent is extended or adjusted under 35 U.S.C. 154(b) by 234 days.

(21) Appl. No.: 12/762,556

(22) Filed: Apr. 19, 2010

(65) Prior Publication Data

US 2011/0029370 A1    Feb. 3, 2011

Related U.S. Application Data

(60) Provisional application No. 61/273,040, filed on Jul. 29, 2009, provisional application No. 61/253,009, filed on Oct. 19, 2009.

(51) Int. Cl.
*G06Q 30/02* (2012.01)
*G06Q 30/00* (2012.01)
(Continued)

(52) U.S. Cl.
CPC ............ *G06Q 30/0211* (2013.01); *G01S 5/02* (2013.01); *G01S 5/0257* (2013.01); *G01S 5/18* (2013.01); *G06Q 30/00* (2013.01); *G06Q 30/0205* (2013.01); *G06Q 30/0207* (2013.01); *G06Q 30/0214* (2013.01); *G06Q 30/0217* (2013.01); *G06Q 30/0224* (2013.01); *G06Q 30/0226* (2013.01); *G06Q 30/0238* (2013.01);
(Continued)

(58) Field of Classification Search
CPC ................... G06Q 30/0207–30/0277
See application file for complete search history.

(56) References Cited

U.S. PATENT DOCUMENTS 4,649,385 A * 3/1987 Aires ................. G07C 9/00111
340/8.1
5,263,006 A    11/1993 Hermesmeyer
(Continued)

FOREIGN PATENT DOCUMENTS

CN    101356545    1/2009
JP    62166495    7/1987
(Continued)

OTHER PUBLICATIONS

"The Cricket Indoor Location System", Nissanka Priyantha, PhD Thesis submitted Jun. 2005 to Massachusetts Institute of Technology.*

(Continued)

*Primary Examiner* — David J Stoltenberg
(74) *Attorney, Agent, or Firm* — Van Pelt, Yi & James LLP

(57) ABSTRACT

The transmission system transmits an encrypted identifier ultrasonically in an open-air environment using an ultrasonic transmitter. The ultrasonic identifier is associated with a location, which may be a store or a department within a store, and may be received by a microphone on a mobile phone. The identifier may be used to infer presence of the mobile phone user at the location associated with the identifier. The transmitter may include an ultrasonic transducer. The system may further provide a reward, responsive to inferring presence at the location.

61 Claims, 12 Drawing Sheets

(51) Int. Cl.
*H04W 4/02* (2009.01)
*H04W 4/20* (2009.01)
*H04L 29/08* (2006.01)
*G01S 5/18* (2006.01)
*G01S 5/02* (2010.01)
*H04W 4/04* (2009.01)

(52) U.S. Cl.
CPC ......... *G06Q 30/0261* (2013.01); *H04L 67/18* (2013.01); *H04W 4/02* (2013.01); *H04W 4/20* (2013.01); *G06K 2209/23* (2013.01); *H04W 4/04* (2013.01)

(56) References Cited

U.S. PATENT DOCUMENTS

| | | | |
|---|---|---|---|
| 5,268,179 | A | 12/1993 | Rudella |
| 5,674,333 | A | 10/1997 | Spencer |
| 5,974,333 | A | 10/1999 | Chen |
| 6,317,592 | B1 | 11/2001 | Campana et al. |
| 6,362,778 | B2 | 3/2002 | Neher |
| 6,607,136 | B1 | 8/2003 | Atsmon |
| 6,775,704 | B1* | 8/2004 | Watson et al. ............... 709/229 |
| 7,124,186 | B2 | 10/2006 | Piccionelli |
| 7,406,438 | B2 | 7/2008 | Walker et al. |
| 7,665,660 | B2 | 2/2010 | Degliantoni et al. |
| 7,706,838 | B2 | 4/2010 | Atsmon |
| 7,739,705 | B2 | 6/2010 | Lee et al. |
| 7,761,378 | B2 | 7/2010 | Postrel |
| 7,933,841 | B2 | 4/2011 | Schmeyer et al. |
| 7,970,669 | B1 | 6/2011 | Santos |
| 7,991,194 | B2 | 8/2011 | Kim et al. |
| 8,989,779 | B1 | 3/2015 | Centore, III |
| 9,031,858 | B2 | 5/2015 | Angell |
| 2002/0010629 | A1 | 1/2002 | Diamond |
| 2002/0055968 | A1 | 5/2002 | Wishoff |
| 2002/0102993 | A1 | 8/2002 | Hendrey |
| 2002/0111859 | A1 | 8/2002 | Sheldon et al. |
| 2002/0120516 | A1 | 8/2002 | Sakagami et al. |
| 2003/0052970 | A1* | 3/2003 | Dodds et al. ............... 348/148 |
| 2003/0093314 | A1 | 5/2003 | Leung et al. |
| 2003/0200489 | A1* | 10/2003 | Hars ............... G06Q 30/02 714/703 |
| 2004/0031856 | A1 | 2/2004 | Atsmon |
| 2004/0212504 | A1* | 10/2004 | Forcier et al. ............ 340/572.1 |
| 2004/0249710 | A1 | 12/2004 | Smith et al. |
| 2005/0043992 | A1 | 2/2005 | Cohagan et al. |
| 2005/0136949 | A1 | 6/2005 | Barnes |
| 2005/0138077 | A1 | 6/2005 | Michael et al. |
| 2005/0165640 | A1 | 7/2005 | Kotorov |
| 2005/0245271 | A1 | 11/2005 | Vesuna |
| 2005/0278215 | A1 | 12/2005 | Seele, Jr. |
| 2006/0066450 | A1 | 3/2006 | Jackson |
| 2006/0167595 | A1 | 7/2006 | Breed et al. |
| 2007/0022010 | A1* | 1/2007 | Blaser ............... G06Q 30/02 705/14.54 |
| 2007/0025456 | A1 | 2/2007 | McCrady |
| 2007/0030798 | A1 | 2/2007 | Okada |
| 2007/0049297 | A1 | 3/2007 | Gopalan et al. |
| 2007/0136132 | A1* | 6/2007 | Weiser et al. ............... 705/14 |
| 2007/0192183 | A1* | 8/2007 | Monaco ............... G06Q 30/02 705/14.25 |
| 2008/0004952 | A1 | 1/2008 | Koli |
| 2008/0010151 | A1 | 1/2008 | Bridges et al. |
| 2008/0057924 | A1 | 3/2008 | Stewart |
| 2008/0072123 | A1* | 3/2008 | Eidson et al. ............... 714/786 |
| 2008/0140479 | A1 | 6/2008 | Mello et al. |
| 2008/0147461 | A1 | 6/2008 | Lee et al. |
| 2008/0189169 | A1 | 8/2008 | Turpin et al. |
| 2008/0248815 | A1 | 10/2008 | Busch |
| 2008/0249856 | A1 | 10/2008 | Angell |
| 2008/0249863 | A1 | 10/2008 | Redmond |
| 2008/0249868 | A1 | 10/2008 | Angell |
| 2008/0255944 | A1 | 10/2008 | Shah et al. |
| 2008/0259732 | A1* | 10/2008 | Booij et al. ............... 367/127 |
| 2008/0261526 | A1 | 10/2008 | Suresh |
| 2008/0262928 | A1 | 10/2008 | Michaelis |
| 2009/0016165 | A1* | 1/2009 | Lee ............... 367/127 |
| 2009/0061884 | A1 | 3/2009 | Rajan et al. |
| 2009/0076912 | A1 | 3/2009 | Rajan et al. |
| 2009/0083122 | A1 | 3/2009 | Angell |
| 2009/0157472 | A1 | 6/2009 | Burazin et al. |
| 2009/0182597 | A1 | 7/2009 | Bull |
| 2009/0207694 | A1 | 8/2009 | Guigne et al. |
| 2009/0222300 | A1 | 9/2009 | Guith et al. |
| 2009/0239553 | A1 | 9/2009 | Wright et al. |
| 2009/0264070 | A1 | 10/2009 | Lim |
| 2009/0271778 | A1 | 10/2009 | Mandyam |
| 2009/0278493 | A1 | 11/2009 | Alden |
| 2009/0278661 | A1 | 11/2009 | Harrington |
| 2009/0279476 | A1 | 11/2009 | Li et al. |
| 2009/0287558 | A1 | 11/2009 | Seth et al. |
| 2009/0298481 | A1 | 12/2009 | Hurst |
| 2009/0299188 | A1* | 12/2009 | Kunita ............... 600/453 |
| 2010/0007485 | A1 | 1/2010 | Kodrin et al. |
| 2010/0076831 | A1 | 3/2010 | Samuel |
| 2010/0125490 | A1 | 5/2010 | Kiciman et al. |
| 2010/0197219 | A1 | 8/2010 | Issa |
| 2010/0240399 | A1 | 9/2010 | Roumeliotis et al. |
| 2010/0279669 | A1 | 11/2010 | Roundtree |
| 2010/0306048 | A1 | 12/2010 | Corduneanu et al. |
| 2011/0018687 | A1 | 1/2011 | Holm |
| 2011/0029364 | A1 | 2/2011 | Roeding et al. |

FOREIGN PATENT DOCUMENTS

| | | |
|---|---|---|
| JP | 2001143184 | 5/2001 |
| JP | 2001217789 | 8/2001 |
| JP | 2001266010 | 9/2001 |
| JP | 2004164128 | 6/2004 |
| JP | 2007193766 | 8/2007 |
| JP | 2009047538 | 3/2009 |
| JP | 2010525462 | 7/2010 |
| WO | 9929058 | 6/1999 |
| WO | 0021203 | 4/2000 |
| WO | 0029920 | 5/2000 |
| WO | 0044113 | 7/2000 |
| WO | 2004057361 | 7/2004 |
| WO | 2008058193 | 5/2008 |
| WO | 2008076927 | 6/2008 |

OTHER PUBLICATIONS

"The Cricket Indoor Location System", Nissanka Priyantha, PhD. Thesis submitted Jun. 2005 to Massachusetts Institute of Technology.*
"Clock Synchronization in Distributed Real-Time Systems", Hermann Kopetz, IEEE Transactions on Computers, vol. C-36, No. 8, Aug. 1987.*
"Compact and Unforgeable Key Establishment Over an ATM Network", Yuliang Zheng and Hideki Imai, INFOCOM '98. Seventeenth Annual Joint Conference of the IEEE Computer and Communications Societies. Proceedings. IEEE, vol. 2, pp. 411-418.*
Timothy L. Murphy, "Ultrasonic Digital Communication System for a Steel Wall Multipath Channel: Methods and Results", Rensselaer Polytechnic Institute, Troy, New York, Dec. 2005, pp. 1-173.
Justin Shumaker, Army Research Laboratory, "Designing an Ultrasonic Modem for Robotic Communications" Mar. 2009, pp. 1-26.
Chuan Li, David A. Hutchins and Roger J. Green, "Short-Range Ultrasonic Digital Communications in Air" IEEE Transactions on Ultrasonics, Ferroelectrics, and Frequency Control, vol. 55, No. 4, Apr. 2008, pp. 1-11.
Vadim Gerasimov, "Things That Talk", Massachusetts Institute of Technology, Jun. 1996, pp. 1-31.
V. Gerasimov and W. Bender, "Things That Talk: Using Sound for Device-to-Device and Device-to-Human Communication", IBM Systems Journal, vol. 39, Nos. 3 & 4, pp. 1-17.
PCT Search Report and Written Opinion dated Jul. 28, 2010.
Madhavapeddy et al., "Context-Aware Computing with Sound", Jan. 1, 2003, http://www.cl.cam.ac.uk/research/srg/netos/papers/2003-ubicomp-audio.pdf.

(56) References Cited

OTHER PUBLICATIONS

Madhavapeddy et al., "Audio Networking: The Forgotten Wireless Technology", IEEE Pervasive Computing, IEEE Service Center, Jan. 1, 2005.

* cited by examiner

METHOD AND SYSTEM FOR PRESENCE DETECTION

CROSS REFERENCE TO RELATED APPLICATIONS

This application claims priority to U.S. Provisional Patent Application No. 61/273,040 entitled, "Method And System For Location-Triggered Interactivity In Offline Environments" filed Jul. 29, 2009 and U.S. Provisional Patent Application No. 61/253,009 entitled, "Method And System For Location-Triggered Interactivity In Offline Environments" filed Oct. 19, 2009, which are hereby incorporated by reference in their entirety.

BACKGROUND

1. Field of the Invention

The present invention relates to the intersection of mobile and the physical world, and specifically, to the use of mobile communication devices to facilitate improved consumer experiences in retail environments.

2. Description of the Related Art

In 1886, John Wanamaker, the inventor of department stores from Philadelphia, is said to have exclaimed "I know that half of my advertising is wasted—I just don't know which half." So, the problem with a lack of useful offers and targeted ads started in offline retail. In the online shopping world over the past 15 years, search engines and behavioral e-commerce targeting engines have helped to reduce the "50% waste." In the physical retail world, however, Wanamaker's comment remains apt.

When a consumer watches a commercial for a store on TV, and the next day sees a promotion from the same store in the newspaper, there is no way for the store to know it is the same person. And when that person walks in and out of different stores afterwards, the retailers cannot know that either, and therefore, cannot make offers that matter to that consumer based on the preferences and previous offers they saw. Even when the consumer finally walks into a specific store, the store owners will not be able to tell who the person is until . . . they are paying at the "point-of-sale" (POS) with their credit card or are showing their store loyalty card, i.e. until they are leaving the store, and it is too late to add another item to the shopping basket. In summary, the "sales loop" in the physical retail world is broken. (Prior art methods for providing purchasing incentives have historically taken place at the point of sale or worse yet, after a purchase is made. The current prior art includes examples of methods and processes that target real-time incentive programs (see U.S. Pat. No. 6,292,786), and even processes that try to influence the consumer at the point-of-sale (see U.S. Pat. No. 5,918,211).

In order to improve the consumer experience, an improved system would be useful for identifying and/or tracking consumers, and for transmitting advertising and rewards to individual consumers based upon the consumers' interests, activities and locations.

DETAILED DESCRIPTION

Figure 1:
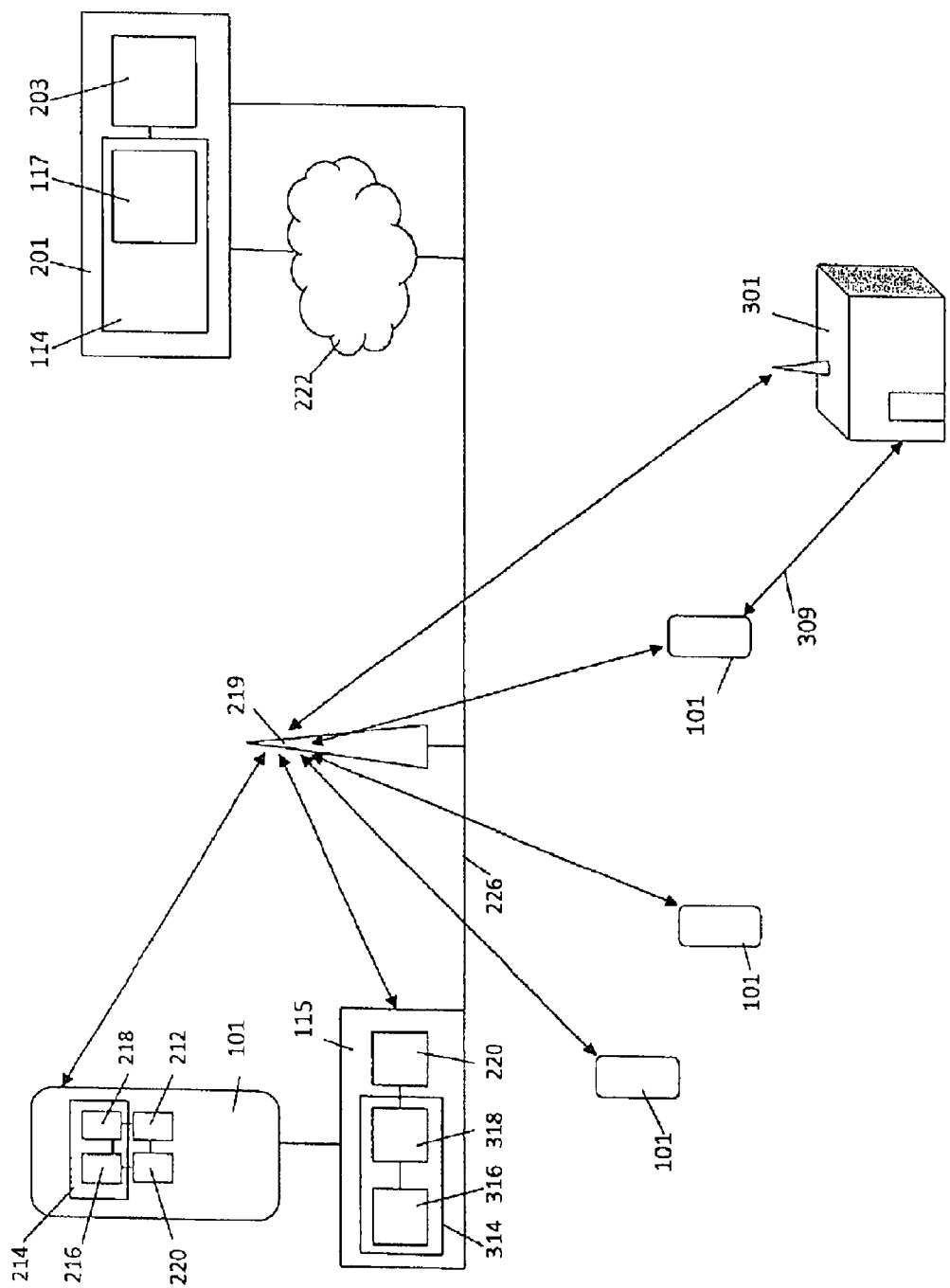
FIG. 1 illustrates communications between mobile phones, stores and the system server.

With reference to FIG. 1, the present invention includes a system and method for transmitting store advertising information directly to consumers through their mobile phones 101. The system includes one or more servers 201, cell phones 101 and one or more communications networks which can be cellular networks 219, the internet 222 and other networks including wired and wireless networks, LAN, WiFi, WiMax, etc. The server includes a microprocessor 114 that performs software instructions. The microprocessor 114 is coupled to databases 203 that store information about the consumers, product and advertising and rules for distribution of the advertising and a rules engine 117 that is the software instructions that are performs by the microprocessor 114. Each cell phone 101 also includes a microprocessor 214 that runs an operating system 216 and downloaded application software 218. The phone 101 also has memory and databases 220 for storing system offers and information.

One of the features of the inventive system is the ability to determine where the consumers are based upon the locations of their mobile phones 101. Many mobile phones 101 are equipped with global positioning system (GPS) units 212 that provide precise location information. The cell phones can transmit this information to the system and the server can determine how close a consumer is to a store 301. The system can also determine if the consumer is within the store 301. If GPS is not available, various other location detection mechanisms can be used to determine the location of the consumer and distance 309 from the store 301.

Because the advertising transmitted by the inventive system can be targeted to each individual consumer, there is a much better correlation between consumers' interests and the transmitted advertising than traditional advertising, such as print, outdoor billboards or television advertising. Since the transmitted advertising is targeted based upon consumer information and location, the inventive system will be able to predict the consumers' purchasing interest. For the first time, the broken offline retail sales loop could be closed, with the inventive system, by using mobile phones, which are the only interactive medium consumers carry with them, including in the moment when they are about to or are in the process of shopping at physical retail stores.

The implications for both consumers and retailers are substantial. Through the inventive system, retailers can tailor their offers, advertising information and incentives/rewards to consumers along the whole chain, from advertising, to promotions, to walking in and out of different stores, to walking into a specific store, to viral effects when consumers discuss retail experiences or products with their friends; then it is likely the consumer experience would improve drastically with more useful offers, and for the retailers, the increase in efficiency of advertising spend, consumer basket size and close rate would be substantial. In order to encourage activities that are associated with purchasing, the inventive system provides rewards such as points that can be accumulated and redeemed for merchandise at the stores, or for digital goods (song downloads, virtual goods etc).

It should be appreciated that the present invention can be implemented in numerous ways, including as a process, an apparatus, a system, a device, a method, a computer readable medium such as a non-transitory computer readable storage medium containing computer readable instructions or computer program code, or as a computer program product comprising a computer usable medium having a computer readable program code embodied therein.

In the context of this document, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, solid state drives, tape, erasable programmable read-only memory (EPROM or flash memory), or any magnetic, electromagnetic, infrared, optical, or electrical system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer readable instructions may be referred to as components or modules. Applications may be hardwired or hard coded in hardware or take the form of software executing on a general purpose computer such that when the software is loaded into and/or executed by the computer, the computer becomes an apparatus for practicing the invention, or they are available via a web service. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

A. Location-Based Personalized Offers

Experience from retail stores shows that the conversion rates from store visits to actual purchases in the physical retail world is typically between 25-60%, depending on the type of retailer, while for online retail sites conversions are typically only 1-3%. In other words, once consumers are entering a physical store, they are likely to actually buy; so the main challenge for physical retailers is to get consumers to visit their stores, to produce more purchases within the store. One of the most effective methods to achieve purchasing is to make the right offers to the right consumers, i.e. relevant offers, rather than "the same irrelevant offers to everybody."

The present invention provides a mass-capable, scalable service that allows targeted personalized rewards and offers based on identification of the consumer's individual presence and profile not at the point-of-sale, but instead at the point-of-entrance to an offline, physical store, or shortly before the point-of-entrance. In order to increase foot traffic, the inventive system provides members with personalized offers or discounts as soon as they walk into a store or within the proximity of a store.

Rather than providing the offers and rewards randomly, the inventive system has triggers that produce the offers and rewards. Various triggers can be detected by the system which can determine an optimum offer that can be based upon consumer location and time. For example, in order to stimulate purchases, personalized rewards and offers can be transmitted from the server to the mobile phone when the customer enters the store, or when she/he gets close to a store (e.g. by preemptively downloading data relevant to a store, either when near the store or because the store is frequently visited, to avoid potential lack of that data in case of loss of wireless reception in the store; in various embodiments, such preemptive downloading may be initiated by the client and/or by the server).

Figure 2:
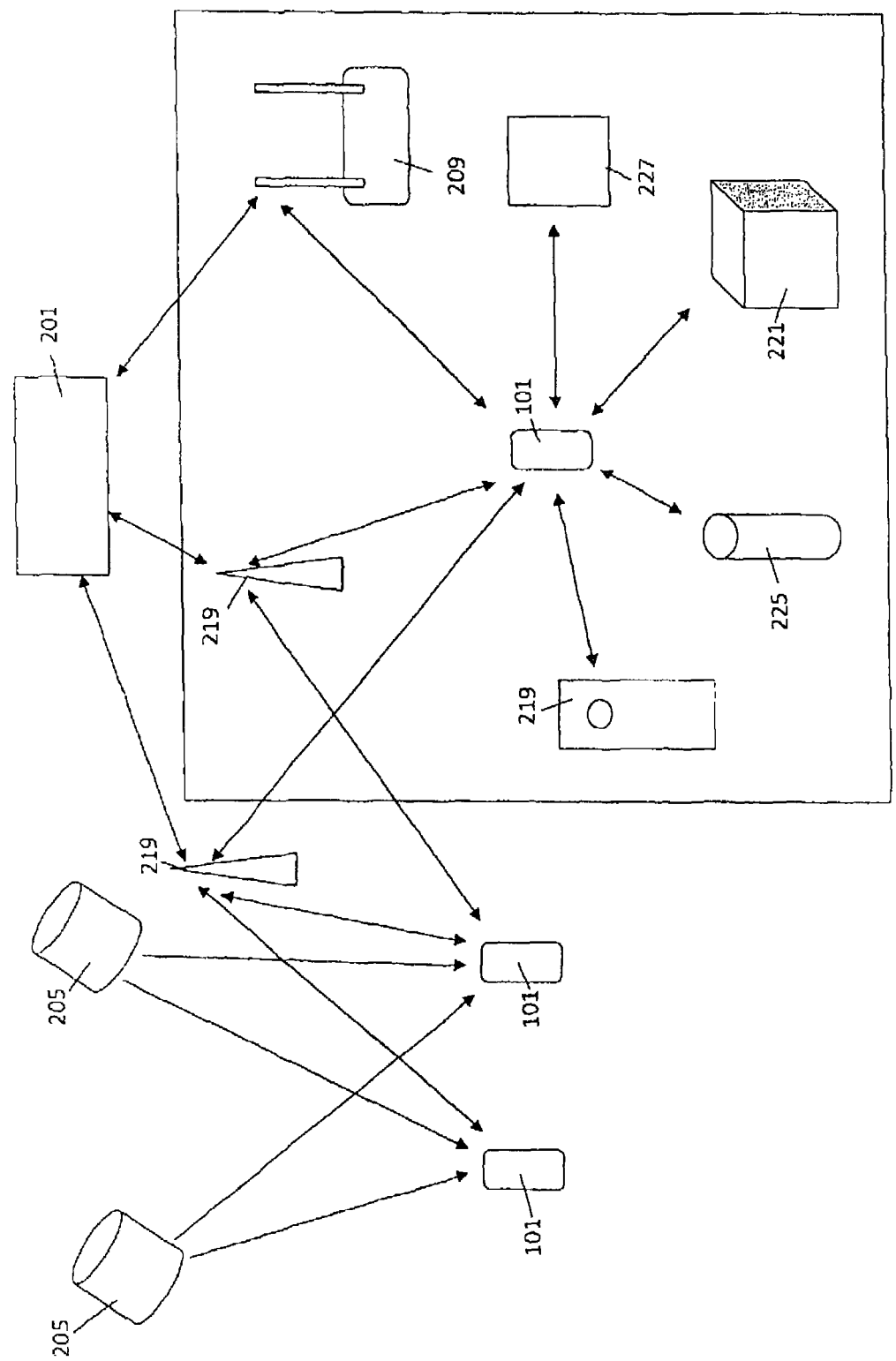
FIG. 2 illustrates detection systems used to detect the locations of the cell phones.

With reference to FIG. 2, various systems can be used to determine the location of the cell phones including: GPS 205, WiFi 209, Wifi beacon identification (without data connectivity), Cell Phone Signals ("Cell ID") 211, short range RF signals 215 including RFID, BlueTooth, PANs, Sound or Sound Pattern Identification (e.g. ultrasonic sound) 219, Magnetic Field detection 221, 1-Dimensional or 2-Dimensional Barcodes, and/or Recognition of Device ID's (e.g. MAC addresses of cell phones). In other embodiments, the inventive system can have transmitter/sensors 225 mounted at the entrance(s) of the stores that detect cell phones as they enter and exit, or elsewhere in the store.

To determine when the user is crossing or has crossed a physical threshold, e.g. a store 301 entrance (which in turn triggers personalized rewards and offers), various techniques may be employed including: rapid degradation of GPS 205 signals, rapid improvement of the WiFi 209 signal, a combination of GPS 205 signal degradation and WiFi 209 signal improvement, a sudden decrease of location data accuracy, sound 219 identification (ultrasonic and/or sound pattern recognition), magnetic field 221 detection, RF signal detection, 1-D or 2-D Barcode Recognition, Recognition of Device ID's (e.g. MAC addresses of cell phones), manual data entry, and/or other methods. The listed detection methods are described in more detail below.

In an embodiment a trigger can include a rapid degradation of GPS 205 signals. GPS 205 technology, including systems integrated into smart phones 101, typically determines location fixes by analyzing data from several (e.g. four or more) satellites which are in a line-of-sight, i.e. "visible" (=unobstructed view) connections. When users of the service walk into a store 301 or other enclosed location, the cell phones 101 frequently lose contact with one or more of the satellites from which signals could previously be received (e.g. at least two out of four satellites) due to signals blocked by the walls and roof or other structures. Such rapid degradation of the GPS 205 signal can serve as a trigger for determining the consumer has entered the store 301, for example in combination with the previous proximity to the store location, and other data.

Another possible trigger is the sudden availability of, or rapid improvement of, a WiFi 209 signal. In addition to or instead of GPS, many cell phones 101 include WiFi transceivers. For in-building locations of Wifi networks, such as stores, that require passing a physical threshold such as a wall/door, passing through that threshold can result in a rapid improvement/strengthening of the WiFi signal. A WiFi 209 transmitter can broadcast a specific "ID" (also called SSID) i.e. its network name. Thereby smartphones 101 can detect specific store WiFi 209 transmitters with (for example) a passive WiFi network scan such as a PROBE request, and detecting its name or SSID. In an embodiment, the inventive system can detect the combination of general location information about the user, rapidly deteriorating GPS signals and concurrent rapidly improving store WiFi signals, leading to higher accuracy of determination that a service user has entered a store 301 or other known buildings such as malls.

Another possible trigger for offers and rewards is a sudden decrease of location data accuracy. Certain hardware or software platforms (e.g. the mobile platform's software developer kit (SDK)) may obscure information relating to one or more location detection techniques, such as GPS satellite information and/or WiFi access point availability, and/or may provide a location value (latitude, longitude) and an accuracy indication, rather than broken out by GPS 205 location data vs. WiFi 209 location data vs. other location values. A sudden decrease in accuracy of the location value (e.g. an accuracy level rapidly going from a 10 ft radius to a 100 ft radius), in combination with general location data (e.g. latitude/longitude data that indicates that an individual is close to a store) may be used to determine with higher accuracy that a service user has entered a store or specific building. An example of such an error radius is the "horizontalAccuracy" value associated with the iPhone Core Location class.

In an embodiment, a sound generator 219 is deployed inside each store 301, which emits sounds inaudible to humans (e.g. ultra-sonic sound), but still detectable to a mobile phone 101 application via the mobile phone's microphone. An example of ultrasonic sound is sound at a frequency above the common range of human hearing (e.g. at least 18 Khz, or at least 19 KHz, or at least 20 KHz) but at or below the upper limit of the frequency response of the microphone in the mobile phone, and the Nyquist frequency of the audio pathway of the mobile phone (i.e. half of the sampling rate of the audio input, which for example at a sampling rate of 44.1 KHz results in an upper frequency bound of 22.05 KHz). In some embodiments, a frequency above the Nyquist frequency (but still below the upper limit of the frequency response of the microphone) may be used in combination with filtering to reduce artifacts, or a modulation scheme designed to be robust in the presence of artifacts. The combination of the latest location fix information and the detection of sonic signaling (including ultrasonic signaling) can serve as a location identification to the system service that a store 301 has been entered. In some embodiments, a minimum threshold sonic signal strength, or a rapid increase in the strength of a sonic signal, may trigger such a location identification.

Sonic signaling as used herein refers generally to the transmission of information, such as an indication of a store associated with the origin of the sonic signal, using sonic (including ultrasonic) signals. One example of sonic signaling is a signal in which one or more frequencies correspond to various signal values, e.g. DTMF or DTMF frequency-shifted into ultrasonic frequencies. Another example of sonic signaling is to use amplitude shift keying. Another example of sonic signaling is to use frequency shift keying. Another example of sonic signaling is to use phase shift keying. In some embodiments, multifrequency signaling such as spread spectrum communications, or a multifrequency carrier signaling, may be used. An example of multifrequency carrier signaling is to designate a predetermined set of frequencies (for example, between 20 KHz and 22 KHz, or between 20 KHz and 24 KHz, or generally between a lower bound between 19 KHz and 20 KHz and an upper bound equal to or slightly below the Nyquist frequency for the sampling rate of an intended receiver) separated by an interval, such as an interval of between 40 Hz and 100 Hz, such as approximately 65 Hz, and for each such frequency, encode a "1" bit as the presence of a carrier signal, such as a sine wave at the frequency, and a "0" bit as the absence of such a signal. A receiver of such a multifrequency signal may then perform Fast Fourier Transforms or related techniques known in the art to identify whether carriers are available at each relevant frequency, and deduce a set of bits, encoding a number, thereby. In some embodiments of multifrequency carrier signaling, for example when a signal is insufficiently unambiguous, multiple samples may be taken over time and averaged, then the average signal may be processed as described above. In some embodiments of multifrequency carrier signaling, a Viterbi decoder may be used to decode the bit patterns, for example if the frequencies are sufficiently close as to cause interference. In general, techniques known to those skilled in the communications arts, especially with respect to modulation and demodulation (e.g. modems), may be employed. Examples of such techniques include the various modem standards designated as V.x (where x is an integer) promulgated by the International Telecommunications Union, Sector T, which are incorporated herein in their entirety by reference for all purposes. Acoustic echo cancellation techniques known to those skilled in the audio communications arts (for example a finite impulse response filter with gradient descent parameter vector updates using LMS, RLS, LMF, or other cost functions known to those skilled in the art; or as disclosed in US Patent Applications Nos. 2009/0225997, 2009/0147942, and/or 2009/0141907, which are herein incorporated by reference in their entirety for all purposes) may also be employed. Examples of ultrasonic communications are discussed in Justin Shumaker, "Designing an Ultrasonic Modem for Robotic Communications," Army Research Laboratory publication ARL-TR-4754; T. L. Murphy, "Ultrasonic Digital Communication System for a Steel Wall Multipath Channel: Methods and Results," Rensselaer Polytechnic Institute, December 2005; Vadim Gerasimov, "Things that Talk," Massachusetts Institute of Technology, June 1996; Vadim Gerasimov et al, "Things that Talk: Using Sound for Device-to-Device and Device-to-Human Communication," IBM Systems Journal, Volume 39, Issue 3-4 (July 2000); and Chuan Li et al, "Short-Range Ultrasonic Digital Communications in Air," IEEE Transactions on Ultrasonics, Ferroelectrics, and Frequency Control, Volume 55, Number 4 (April 2008), all of which are incorporated herein by reference in their entirety for all purposes.

In some embodiments, if a client (e.g. a mobile phone) fails to decode a signal, when (for example by a power check) a signal has been detected or has been detected to be likely, the raw signal, or a characterization therefrom, such as compressed samples, or output from one or more Fourier transforms, may be transmitted to a server, which may return a result of decoding or other result such as a store identifier.

In some embodiments, a server may perform signal analysis to determine the encoded data. In some embodiments, signals may be stored at the server and provided to personnel for refinement of transmission and/or reception techniques. In some embodiments, a server may combine the signal information with other information, such as a last known location (e.g. by GPS, cellular tower triangulation and/or WiFi network detection) and a time at which the location was known, to disambiguate the signal by selecting a store that is likely to correspond to the signal that is plausible given the last known location. An example of a plausible location is a location near such a last known location.

Figure 3:
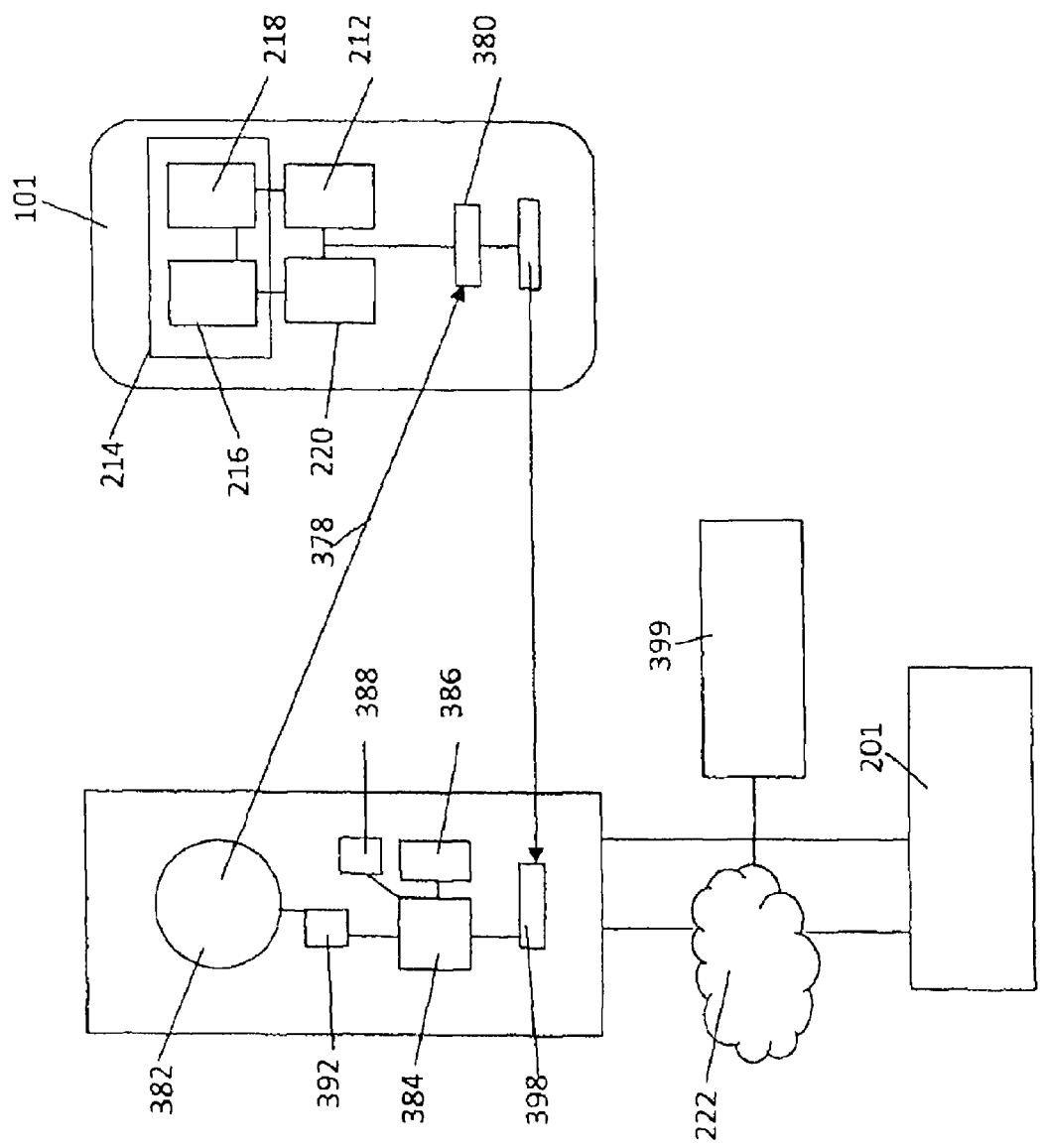
FIG. 3 illustrates a system embodiment using sonic signaling to detect cell phones.

With reference to FIG. 3, in some embodiments, sonic signaling may be performed by a transmitter 382. In some embodiments, a transmitter 382 is a hardware system that incorporates a signal generator such as processor 384, such as a microprocessor, microcontroller, or digital signal processor (for example a PIC microcontroller available from Microchip Technology, Inc., a TMS320 series processor from Texas Instruments, an ARM based processor such as an ADuC7xxx from Analog Devices, Inc., an ADuC8xx, ADSP21xx, or SHARC from Analog Devices, Inc., etc.) connected to a memory 386 (for example, DRAM or SRAM, which in some embodiments may be integrated with the processor) containing program instructions executable by the processor, and/or data used by the program. A transmitter 382 may also incorporate persistent memory 388, such as a flash memory, coupled to the processor and/or incorporated into the processor. The signal generator may generate the ultrasonic signal that is transmitted as described above. In some embodiments, a waveform for transmission may be stored in persistent memory 388, which in various embodiments may be either precalculated and persistently stored or generated by signal generator 384. In some embodiments, a transmitter 382 includes a power supply and/or a battery, which provides power to the other components. A transmitter 382 includes a sonic transducer 390, for example a piezoelectric transducer that converts electrical impulses to ultrasonic vibrations. A transmitter 382 includes an amplifier 392 coupled (directly or indirectly, for example via an audio Digital-to-Analog Converter (DAC), which in some embodiments may be integrated with the processor) to the processor 384, which provides electrical impulses through its output to the transducer 390. In some embodiments, a transmitter 382 may include a network interface 394, such as an Ethernet connector or a wireless interface such as a radio and antenna suitable for 802.11 operation, through which it may receive and/or transmit data such as detected devices, or ID-related information as described below. In some embodiments, a transmitter 382 may include an interface suitable for coupling to a computer 399, such as a USB interface or a network interface, through which software and/or data (such as data relating to IDs as described below) may be updated. In some embodiments, a transmitter 382 may incorporate a microphone 398, and may be capable of receiving sonic signaling as well as transmitting signals. In some embodiments, a transmitter 382 may be incorporated into a wireless access point or other networking customer premise equipment, and may include a network transceiver capable of performing communications such as those described above. In some embodiments, transmitter 382 may include a real-time clock and/or a receiver for receiving broadcast time signals. In some embodiments, transmitter 382 may include an encryptor, which for example may be program instructions executing on processor 384, or may be separate integrated circuitry. In some embodiments, transmitter 382 may include an error correcting code generator and/or an error detecting code generator, which for example may be software instructions executing on processor 384, or may be separate integrated circuitry. The techniques described herein regarding transmission and reception of sonic signaling may be performed at a transmitter 382 as described herein in a manner that will be readily understood by those skilled in the art.

In various embodiments, detection of sonic signaling may be performed continuously, intermittently (e.g. once every minute, or once every ten minutes), and/or in response to a stimulus, such as detection that a mobile device 101 is near one or more stores and/or is moving, and/or an assertion being received from a user that he or she is entering a store. In the case of a trigger, detection may be performed for a predetermined period of time from the time of the trigger, such as one minute, or in response to one or more continued stimuli, such as continued motion. In some embodiments, to decrease power consumption, an easily detectable carrier signal, such as a sine wave 378 modulated at a predetermined frequency, may be generated by a transmitter 382 and detected at a mobile phone 101 by a microphone 380, which may then trigger more computationally expensive demodulation processing. The cell phone 101 may respond to the transmitter 382 by emitting an ultrasonic signal that is detected by the microphone 398. In some embodiments, such power efficiency may be achieved by measuring the energy at a frequency range in which the transmitter operates, and demodulating if the energy exceeds a threshold.

In some embodiments, sonic signaling may be used to indicate store premises, without encoding additional information. In some embodiments, sonic signaling may encode a store identifier (ID), for example a numeric identifier or an encoding of a string. Such a store ID may be received at a mobile phone 101 and interpreted as an assertion of presence at the associated store. In some embodiments, a transmitted store ID may be obscured, changed, encrypted, or otherwise protected from unauthorized access. In one example, a store ID may be combined with another value at the transmitter (for example a pseudorandom number, a number in a predetermined sequence such as an encoded time, or a sequentially generated number) and encrypted (for example using one half of an asymmetric key pair such as an RSA public/private key pair). Such a transmission may be received at a mobile phone 101 and either decrypted there using the other half of the asymmetric key pair, or transmitted to a server, where it is so decrypted and optionally transmitted back to the mobile phone, and the store ID may be separated and processed. In another example, a transmitter 382 connected to a network such as the internet 222 may receive an ID from a server 201, and may transmit that ID, either alone or combined with a store ID as described above. The server may vary IDs on a fixed or variable schedule, and may transmit one or more ID's associated with stores to clients at mobile phones 101. In another example, a transmitter (or a computing device connected to a transmitter via a network such as an Ethernet network or a wireless network, or via a physical connection such as USB) may vary keys or identifiers according to a fixed schedule (such as once a day or once a week), for example according to a sequence created a priori, or according to a pseudorandom number generator such as linear congruential sequence generator. A server 201 may generate or retrieve corresponding keys, and may transmit one or more keys to mobile clients which are valid for a store at any given time (for example, including one or more keys before and/or after the key that expected to be currently used, to account for clock drift and for vagaries in key updates to a client), or may verify validity of a key when requested by a client. In this context, a key may be either an alternate identifier or a component of an identifier, such as a value combined with the store ID and encrypted as described above. In another example, a challenge/response protocol may be employed. For example, a client may generate a pseudorandom nonce value and transmit it to a beacon (for example using ultrasonic signaling), and the beacon may encode the identifier (or a portion thereof, such as a store IDf) together with the nonce, encrypt the result and transmit it to the client, where it may be verified. In some embodiments, a cryptographic hash (such as an MD5, SHA1 or SHA512 hash) may be employed in the above-described examples, for example by keying a hash using a key as described above, and verifying against an independently generated key hash at the mobile client or a server that receives it from a mobile client. Such verification may be done against candidate store IDs, for example IDs associated with one or more stores nearby the mobile phone's last known location.

In some embodiments, unsynchonized clocks, as occurring in time-varying codes, may be re-synchronized. An example of re-synchronizing a clock is for clients (e.g. mobile phones) to report to a server what codes they are receiving, and for the server to determine, based on reports of codes received, that de-synchronization (which may, for example, be due to clock drift, or loss of power at a transmitter) has occurred. Based on that occurrence and the evidence of time being used at a transmitter as received from clients (for example, by more than a threshold number of clients, such as three, or a threshold percentage of clients during a predetermined period of time, such as at least 90% of clients reporting within two days), a time associated with the transmitter at the server may be updated to reflect the data received from clients.

In some embodiments, sonic signaling may encode other information, such as consumer offers, product or service information, technical information, or any other information deemed relevant to the application that receives it. This information can be fed to the store transceiver via the Internet, e.g. through a Wifi connection that allows remote access to the store transceiver via secure data connections. In another embodiment, the mobile device can emit ultrasonic sound information that is picked up by the store transceiver.

In some embodiments, data sent by sonic (or other) signaling may be processed to include an error correcting code, such as a BCH code, a Constant-weight code, a Convolutional code, a Group code, a Golay code such as a Binary Golay code, a Goppa code, a Hadamard code, a Hagelbarger code, a Hamming code, a Latin Square based code, a Lexicographic code, a sparse graph code such as a Low-Density Parity-Check code, an LT or "Fountain" code, an Online code, a Raptor code, a Reed-Solomon code, a Reed-Muller code, a Repeat-accumulate code, a Repetition code such as Triple modular redundancy code, a Tornado code, a Turbo code, or other error correcting codes known to those skilled in the art. In various embodiments, such codes may be applied in a single dimension or in multiple dimensions, may be combined, and may be combined with error detecting codes such as parity and cyclic redundancy checks. Error correcting codes may be decoded and applied to correct transmission and/or reception errors at a receiver, or at a server receiving communications from a receiver, according to their respective techniques. In some embodiments in which different potential receivers are capable of different frequency ranges, a frequency spectrum that is interpretable by all potential receivers may be allocated to data and potentially some error correcting codes, and an additional frequency spectrum that is interperable by some but not all potential receivers may be allocated to additional error correcting codes. For example, if a first receiver is capable of 48 KHz sampling, with a corresponding Nyquist frequency of 24 KHz, while a second receiver is capable only of 44 KHz sampling, with a corresponding Nyquist frequency of 22 KHz, then data and sufficient error correcting codes may be transmitted using 20 KHz-22 KHz spectrum, and additional error correcting codes may be transmitted using 22 KHz-24 KHz spectrum. Each receiver would then interpret and use whatever signals they were capable of.

In some embodiments, distance between a mobile phone 101 and a sonic transceiver may be calculated using timing information, such as the time required for a roundtrip using ultrasonic signaling. Multiple sonic signaling beacons may also be triangulated to determine the location of a mobile phone 101 within a store.

Another method for detecting a consumer within a store is the detection of a change in the ambient magnetic field 221. With reverence to FIG. 2, a magnetic field 221 can be created in a location or store, through a magnet, or through an electrically induced field. This magnetic energy can be detected by mobile devices 101 with magnetometers. In a further embodiment, magnetic field 221 can be a sequence of magnetic field strengths or polarizations (or other variations) that encodes a store ID, for example as discussed above with regards to sonic signaling. Such a magnetic field 221 typically gets weaker immediately outside the store 301, or will not be detectable for the phone at all anymore, due to the general rapid degradation of magnetic fields over short distances.

Another method for detecting a consumer within a store is to detect a change in the acoustic properties that indicates that a consumer is indoors, for example by detecting acoustic echoes characteristic of bounces between walls, floors and/or ceilings. Knowledge that a mobile phone is indoors may be combined with information about the last known location of the mobile phone to determine which store has been entered.

Another method for detecting a consumer within a store is to play within the store an audible sound such as music that is temporally known to a server (e.g. by a prearranged playlist, by the server providing the sound to the store, or by a microphone within the store transmitting sound to the server). Sound detected at a mobile phone can then be identified with respect to sounds known to be present at stores near the mobile phone, to determine where the mobile phone is.

Figure 4:
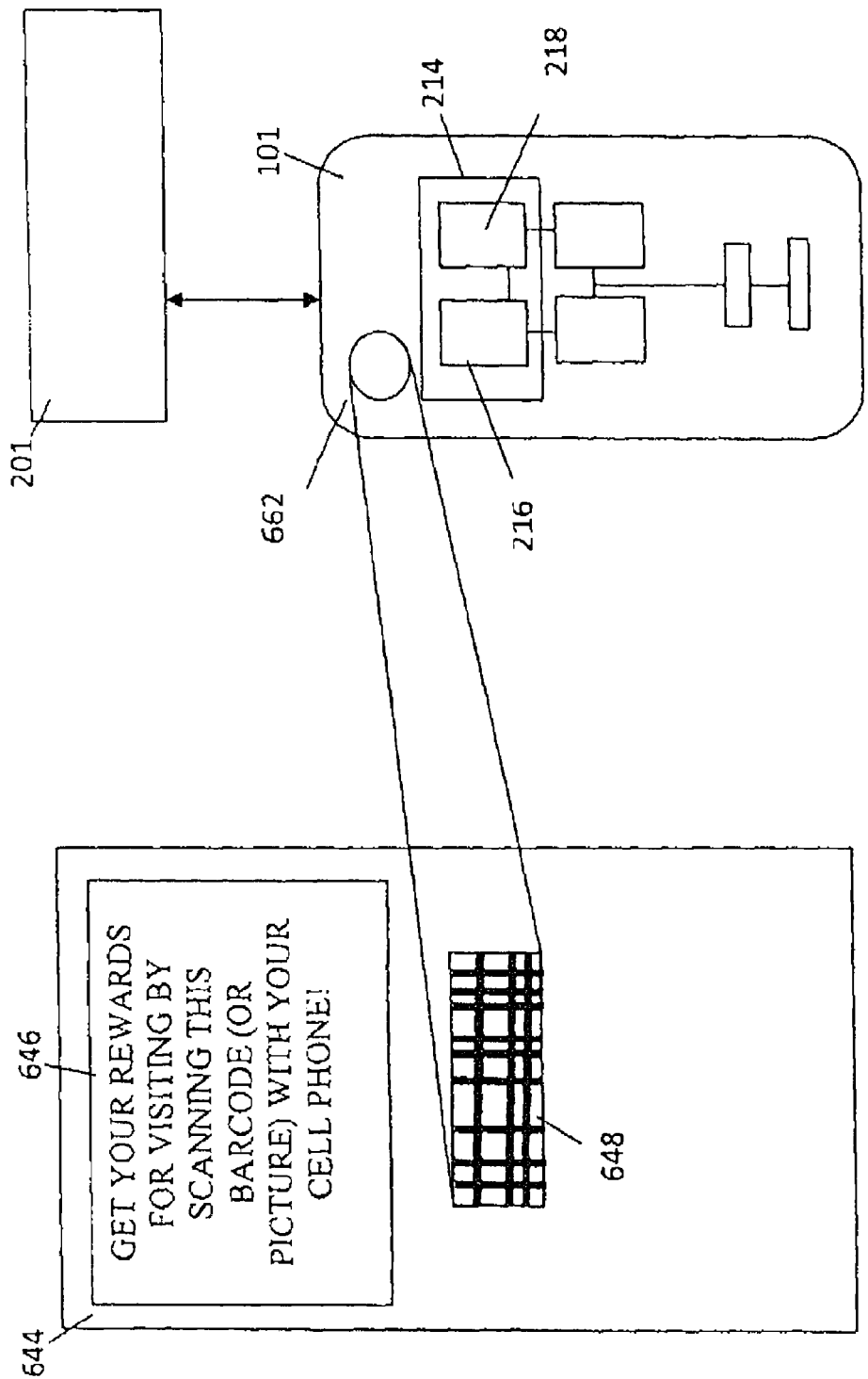
FIG. 4 illustrates a system embodiment using bar codes to detect cell phones.

Another method for detecting a consumer within a store is the recognition of 1-dimensional barcodes, 2-dimensional barcodes (e.g. QR codes) or other unique pictures. With reference to FIG. 4, in this example, a cell phone user discovers a sign 644 in the store (e.g. at the cash register or at the entrance of the store) advertising rewards, e.g. with a message such as "Get your rewards for visiting by scanning this barcode (or picture) with your cell phone using MOBshop!" 646, followed by the display of a barcode 648 unique to the store (containing a store ID), or a unique image. The user can then use the built-in camera 662 of the cell phone 101 to take a picture of the unique barcode or image, or capture it without taking a picture (i.e. simply by holding the phone in front of the sign with the camera active), and recognition software 218 in the phone application or on the server 201 would return the store identification and determine the specific user's presence in the store, so that the rewards and specific offers can be rendered to the phone app.

Each store has a different barcode or picture, thereby allowing a clear identification.

Another method for detecting a consumer within a store is to provide a display that rotates identifiers on a fixed schedule, or in coordination with a server to which it is connected. The operation of this display is similar to an RSA SecurID token, available from RSA Security, Inc. In various embodiments, a user takes a picture of the display including the identifier (which in various embodiments may be a numeric identifier and/or a barcode identifier) and the identifier is extracted, or the user enters the identifier into his or her mobile phone, and it is correlated with the store ID presently displaying the identifier. In some embodiments, multiple geographically distinct stores may display the same identifier, in which case the store displaying the entered identifier which is closest to the user's last known location may be used.

Figure 5:
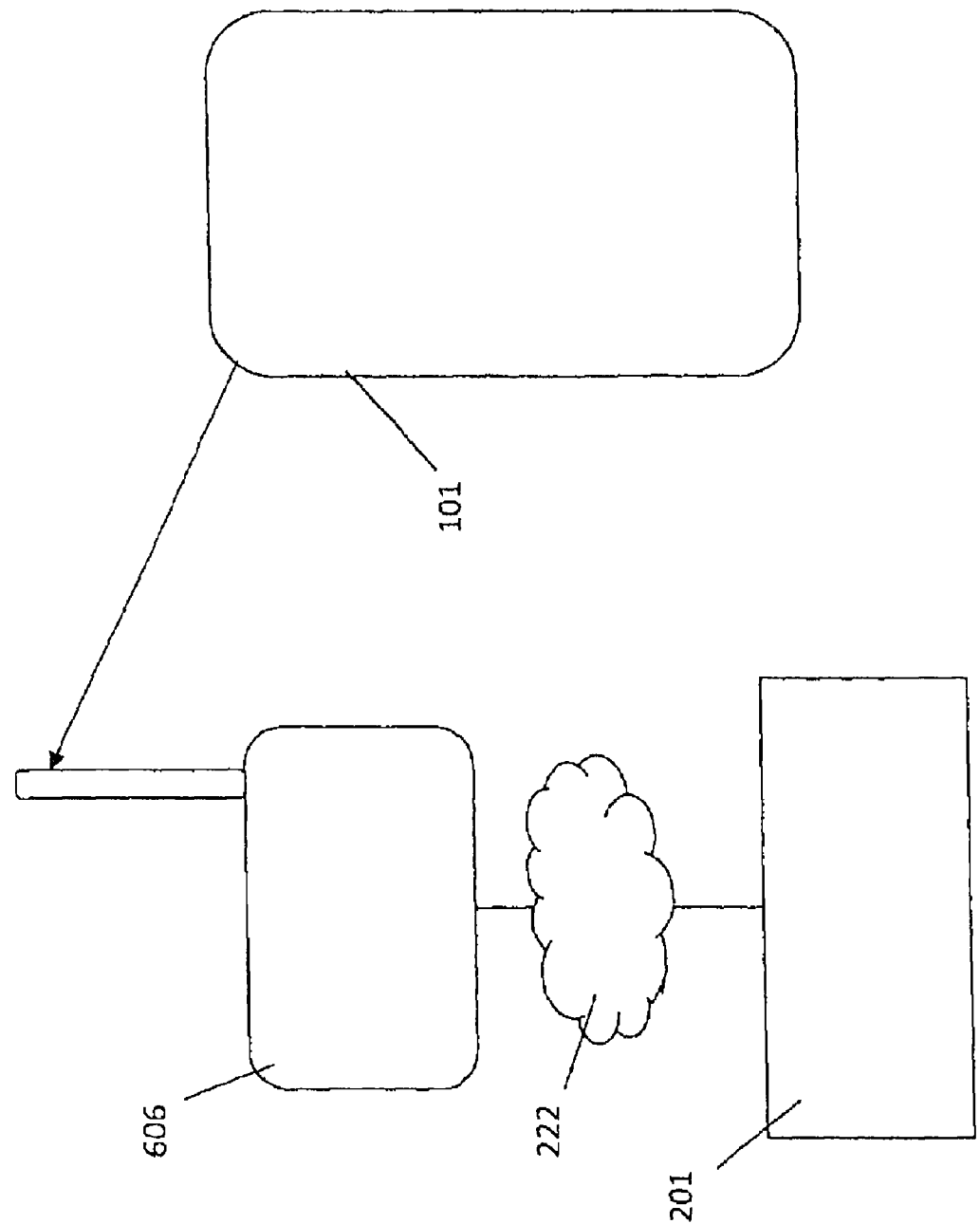
FIG. 5 illustrates a system embodiment using WiFi RF signaling to detect cell phones.

With reference to FIG. 5, another method for detecting a consumer within a store is the identification of the user's device ID. Electronic devices that can be connected to many types of networks, including cell phones 101, have a unique device identifier known as a MAC address. When the user walks into a store that is Wifi-enabled (see e.g. "IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications" (IEEE Std. 802.11-2007), IEEE Computer Society (June 2007), which is incorporated herein by reference in its entirety for all purposes) with WiFi enabled on his or her mobile phone 101, the mobile phone 101 will commonly send out a periodic PROBE request frame. Such a PROBE request may be detected by a Wifi device 606 affiliated with a store. In various embodiments, a WiFi device 606 may be a dedicated presence detection device, or may offer access to internet and other services as a WiFi access point, in a manner known to those skilled in the art, for example by permitting a device to connect to the WiFi device 606, assigning an IP address via DHCP, and enabling networked communications with the internet. A WiFi device 606 may include a wireless antenna and a wireless receiver and optional transmitter (or a transceiver combining such functions), as well as a programmable processor and a memory such as a DRAM and/or Flash memory. Such a device 606 may transmit the MAC addresses of devices 101 that have been encountered (or of certain devices, such as devices that are encountered which have not been previously encountered within a fixed period of time, such as five minutes, and/or devices whose MAC addresses match a pattern, such as one or more prefixes, corresponding to one or more classes of mobile phones, and/or devices whose MAC addresses do not match a pattern, such as one or more prefixes and/or a list of excluded devices) to a MOBshop server 201 through the internet 222. In some embodiments, devices that are determined to be associated with a store employee or other personnel who are frequently present may be added to a list of excluded devices, for example by identifying such devices by their exceeding a threshold amount of presence in a predetermined period of time, such as four hours in a day, or twenty hours in a week. In some embodiments, such MAC addresses may be accumulated in a memory, such as a DRAM or Flash memory, prior to transmission. In some embodiments, transmission may be made via WiFi, over the internet, using a wired connection, and/or using a VPN over SSL or IPSec. At the MOBshop server 201, a MAC address received from a store may be matched against MAC addresses of MOBshop users (which for example may be programmatically detected at mobile phones 101, optionally with user permission, and transmitted to and stored at MOBshop servers). If a MAC address match is found, then MOBshop can assign the correct rewards to the user, and make the right relevant offers.

In some embodiments, a MAC address match may be used to notify a user to execute a MOBshop application on his or her mobile phone 101. For example, a MAC address match as described above may indicate that a particular user is present at a particular store. This information may be cross-checked with information relating to which users are currently running a MOBshop application (which may for example be determined by whether a last call from that user's mobile phone to a MOBshop API was made within a predetermined period of time, such as ten minutes). If it is determined that the user is not presently running a MOBshop application, then a message may be sent to the user (for example using SMS or Apple's Push Notification Service) advising the user to run the application. In some embodiments, such a message may include information about a benefit of running the application, such as a total amount of discounts available to him or her, or an example of a discount.

In some embodiments, multiple devices, such as WiFi devices detecting MAC addresses and/or sonic signaling devices, may be employed to triangulate the location of a mobile phone within a store using accessibility and/or signal strength. Such techniques are known to those skilled in the art. Such in-store locational data may be correlated with information regarding classes of merchandise within a store (for example by determining which from among a set bounding rectangles associated with a class of merchandise in the store contains the determined location), and such data regarding what products a user is inferred to have spent time looking at may be used in targeting. In some embodiments, time may be used as a factor in such analysis, i.e. by discarding categories of merchandise in which users spent little time (e.g. because they were simply in transit), while counting a class of merchandise as one for which the user spent more time shopping as being of interest to that user when the time within a region defined for that class of merchandise exceeds a threshold, such as two minutes. In some embodiments, both transitory presence (e.g. for tracking foot traffic) and persistent presence (e.g. for determining shopping interests) may be tracked.

In some embodiments, MAC address information and/or in-store locational data may be tracked and provided to partners, such as retailers, to assist in understanding customer behavior. In various embodiments, such information may be provided for all relevant devices encountered, whether they are known users or not, for users who have opted in, and/or for users who have not opted out, and may or may not be anonymized before providing to the partner. An example of anonymizing such information is to replace the MAC address with a different corresponding identifier, which in various embodiments may (for example) be randomly generated, hashed, or sequentially assigned. Another example of anonymizing such information is to provide patterns rather than user-specific information, such as characterizations of overlap in visitations with other retailers or classes of retailer. An example of such patterns is a series of one or more matrices based on different time periods (e.g. last day, last week, last month, last year) with a summary number of the number of shared visitors between a partner and various other retailers or classes of retailers. Such a matrix may, for example, be encoded as a set of key/value pairs in which the key is a retailer or class of retailer, and the value is the number of users observed at the partner (or at another targeted retailer) which were also observed at the retailer or class of retailer corresponding to the key during the time period of characteristic of the matrix. In some embodiments, entries for zero-valued pairs may be omitted altogether, e.g. to reduce the data requirements for sparse data. In some embodiments, matrices depending on each time period may be encoded together, for example using a hierarchical structure such as XML, in which the time period is a child of the retailer or class of retailer, or vice-versa.

In some embodiments, other sources and forms of location data can be used to determine consumer location. Some stores include in-store WiFi 209 beacons which are a simplified version of WiFi. These beacons are essentially WiFi 209 transmitters that may not be connected to the internet, but still transmit a unique SSID that will be different for each in-store beacon, e.g. STORE_A126 (means Retailer A's store #126), or that are unique within a geography. This SSID is used by the service to identify the in-store presence of the user. This works by a "reading" the currently available SSID's through a mobile app on the user's device via a passive scan of a WiFi network such as a PROBE request. The inventive system can determine that a user is within specific stores 301 when the cell phone 101 detects the store's SSID, alone or in combination with the last known location of the mobile phone.

In other embodiments, other location detection methods can be used including cell ID triangulation. Based on triangulation methods use cell tower 211 data, this can give supplemental information. Some stores include Bluetooth transceivers 225. Consumers can also be identified through Bluetooth technology running both in the retail store 301 and on the system application running on the cell phone 101. As the user crosses the point-of-entry threshold and enters in the store 301, the Bluetooth on the mobile phone 101 syncs with the Bluetooth network enabled in the physical store 301, and passes a new status flag to the service's server or in-phone app. Other RF signals that the cell phones 101 may detect include NFC (Near Field Communication) signals and RFID signals which provide proximity detection to determine when a customer is close to a corresponding device that can be placed in a product storage area in the store.

The cell phones 101 can also predict or improve the accuracy determining the threshold crossing (store entry) based upon data signals from accelerometers and compasses within the cell phones. Accelerometers and compasses can be used to determine where a customer is moving within a store. Position information may indicate that the customer is in a central area of a store and based upon the accelerometer and/or compass information, the system can determine which direction the customer is moving. By comparing the user movement direction to a store layout, the department the user is moving towards can be determined. Since most stores are not magnetically shielded and cell phones 101 cannot receive GPS 205 signals, these alternative location detection systems provides a means for estimating where the customer is moving when no other position signals are available (such as different Wifi transmitters that would allow for Wifi triangulation within the store).

In yet another embodiment, the consumer can input his or her location into the cell phone 101 which transmits the location information to the server 201. This information can be combined with general location data to ensure that the proper offers and rewards are being provided to the user. Rather than typing the name or address of the store, the user can type in a specific "partner code" that is unique to the store (e.g. "383") into the mobile service. This code can be displayed e.g. on a wall inside in the store. The service combines the manual entry with the general location information, and determines the threshold has been crossed. In some embodiments, a mobile phone may determine its current location and transmit it to a server. The server may generate a list of candidate stores near the reported location. A client program running on the mobile phone may present the candidate locations, or a subset thereof, to the user in a selectable list, and receive a selection of the store from the user.

In prior art embodiments, standard system sensors (such as an infrared sensors) 227 are placed at the entrance of each store which detect consumers entering the store 301. However, sensor 227 systems such as infrared entrance transmitters are not only costly to deploy for retailers, but more importantly, they cannot usually automatically identify the individual person walking into the store 301. These standard sensors may only know that "a" customer walked into the store, but may not be able to identify "who" came in. If the store 301 wants to individually identify consumers via such sensor devices 227, the above described embodiments will allow this for the first time.

In a final embodiment, a system sensor transmitter 227 can be placed at the entrance that transmits a signal that can be accepted by mobile phone 101 applications. In this embodiment, a signal from a system transmitter is received at a consumer's cell phone 101 from each retailer at each entrance as they walk through the door and transmit their profile to the retailer's device. The store 301 system then sends a signal to the system server 201 that the user is in a store 301.

Various techniques may be employed to reduce the probability of fraud in the reporting of presence at a store. In some embodiments, an assertion of presence at a store may be validated against various criteria such as the last known location of the mobile phone and the time since the last known location and/or error radius of the mobile phone (which in some embodiments may be required to be instantaneous and/or received within a short time threshold, such as ten seconds). If it is determined that it is unlikely that the mobile phone traveled from the last known location since the time of the last report, the assertion may be rejected. In some embodiments, multiple sequential locational reports and/or assertions of presence in stores, and the times thereof, may be analyzed to determine whether it is plausible that the reports are accurate, and the assertion may be rejected if it is determined not to be plausible, e.g. if it requires a rapidity of transit that is infeasible, for example a velocity in excess of 80 miles per hour for over short (e.g. less than two hour) periods of time.

B. Rewards

Since consumers are likely to make purchases when they walk into a physical store (typically 20-50 times more likely than when they visit a retail website online), incentives are provided for activity that is related to store visits. The inventive system can identify the locations of the consumer and determine when they enter a store. In an embodiment, points which are redeemable for discounts at all participating retailers, or for virtual goods, are awarded for activity that increases the likelihood of purchasing. No purchase is necessary in order to receive the offers or discounts. Points can be given for the actions including: entry into a store, duration of stay in the store, sweepstakes, surprise offers and games when the consumer is at the store, possibly at a designated time and/or area within the store.

When a consumer walks into any store partnered with the inventive system, points are awarded. In an embodiment, five points are awarded for entering a store, and the points can be used at all participating retailers for future discounts (1 cent per point) or for song downloads. Specific rules can be automatically applied to the user's points account. For example, the points may be limited to a specific number of entries per day. For example, a first entrance will be five points, a second entrance will be three points and a third entrance will be one point for any single day. Alternatively, limitations may depend on the level of purchasing activity. A "gold status" member may be granted points multiple times per day for store visits, while a "rookie status" member may be granted points only once per day (all software rules-based). The system may also determine the time between entrances. If the time between entrances is too short, the additional points may not be awarded. The required time delay for additional points may be two hours. Also, to avoid fraud by "hackers," the system may not award points if a user supposedly enters one store, and a second store in another location within minutes, although it is impossible to reach that second store within minutes when using normal means of transportation. Certain other point conditions may apply. For example, if a customer makes a large purchase of $1,000, the subsequent store entrance that day will be awarded full five points regardless of delay time.

In an embodiment, the duration of the customer's stay at the store can result in additional points being awarded. For example, a point can be awarded for every ten minutes that the customer shops in the store. This rate of point accumulation may also decrease with time. For example, a point may be awarded for the first ten minutes, but it may take another half hour in the store to receive the next point. In another embodiment, the frequency of store visits influence the number of points awarded. For example, double points may be awarded if the customer comes back to the same store within a week, when his/her previous purchasing pattern shows he/she usually visits the store only every other week.

When the customer is in the store, the system may provide other rewards such as: sweepstakes, surprise offers and games. The user's ID may automatically be placed in a sweep stakes drawing which can be awarded after a set time period such as: daily, weekly, monthly, etc. This may depend upon the value of the prizes. Small prizes can be awarded daily while larger more valuable prizes can be awarded weekly, monthly, etc. Surprise rewards can also be randomly transmitted. This can be set based upon store traffic or customer activity. For example, a reward such as points or a discount can be transmitted to one or more customers after 1,000 shoppers have entered the store. Alternatively, after the customer has entered a store ten times, points or a discount can be transmitted to the customer. A customer may also automatically enter into a sweepstakes, for example a sweepstakes as described above, when they enter a store.

The rewards and offers are displayed on the cell phone. For example, an offer of points for going to a store can be displayed as, "100 points to win for someone who walks into Store A today—presented by brand X!" Furthermore, surprise offers may show up on the customer's mobile phone, based on time intervals or other factors. For example, every nine minutes at a specific store, the customer may see a special surprise offer that can only be purchased at that price in the next 30 minutes. These surprise offers can be personalized based on shopping profile etc, i.e. Jenny may receive a different surprise offer than Dave.

Various games are possible. For example, in a "scavenger hunt" game, consumers may be able to gain rewards by finding certain items or information in the store, e.g. answer a question on their mobile device, e.g. "What is the lowest-priced TV set in this store? A: $299, B: $99, C: $399? Get ten points for the right answer!"

The inventive system can be used as a social network. The inventive system can display and publish the discounts gained by redeeming their accumulated system points for all to see or restricted to friends of the system members to see. The system may automatically post this to the customer's page on the system website.

In an embodiment, the rewards can be customized for each individual member with different members receiving different rewards for the same activities. This can be useful when certain members are more likely to purchase more expensive items. For example, with reference to Table 1, consumer Jenny may receive the following rewards:

TABLE 1

| ACTIONS | REWARDS |
| --- | --- |
| Entering store A | 5 points |
| Entering store B | 10 points |
| Staying 5 min longer at store A | 3 points |
| Returning to store A within the next 7 days | Double points for both visits |
| Forwarding a promotion from store A to her friend | Double points for both if her friend uses the promotion and purchases the product |
| Inviting her friends to the service | 5 points per friend who signs up, 10 per friend who uses the service |
| Post a promotion to her friends | 1 point for every time one of Jenny's friends clicks on the promotion |
| Give her friend shopping advice on the service | 5 points for each advice |

In comparison, with reference to Table 2, consumer Dave may receive a very different set of incentives, based on his profile, and based on retailer partners' target demographics or preferred shopping patterns:

TABLE 2

| ACTIONS | REWARDS |
| --- | --- |
| Entering store B | 5 points |
| Staying 5 min longer at store A | 6 points |
| Returning within the next 7 days to store A | Double points for both visits |
| Forwarding a promotion from store A to her friend | 5 points for both if her friend uses the promotion and purchases the product |
| Inviting his friends to the service | 10 points per friend who signs up, 20 per friend who uses the service |
| Post a promotion to his friends | 1 point for every time one of Dave's friends clicks on the promotion |
| Give his friends shopping advice on the service | 3 points for each advice |

Figure 6:
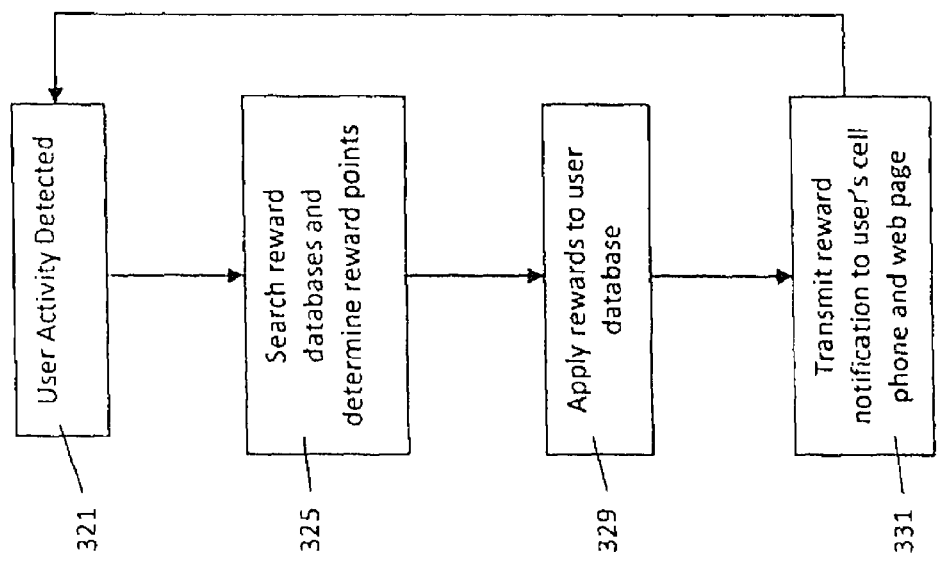
FIG. 6 illustrates a flowchart of rewards transmitted to cell phone users.

With reference to FIG. 6 a basic flow chart regarding user activity rewards is illustrated. The system first detects user activity 321. The activity is transmitted to the server which searches the user and rewards databases to determine the rewards points 325 for the user. Because the system can reward points at different rates, the activity rewards can be different for different system users. The system then applies the rewards to the user account in the user database 329 and transmits the reward notification to the user 331.

The system observes shopping patterns and, by trial-and-error, and by forecasting methods based on other (similar) profiles, determines the "critical amount of rewards" that change an individual's purchasing patterns. For example, it may take Jenny only 5 points to enter Store A more often than before, but it may take Dave 15 points to change his purchasing patterns. The system can then adjust the rewards to meet the critical amount of rewards to increase purchasing by the user.

Figure 7:
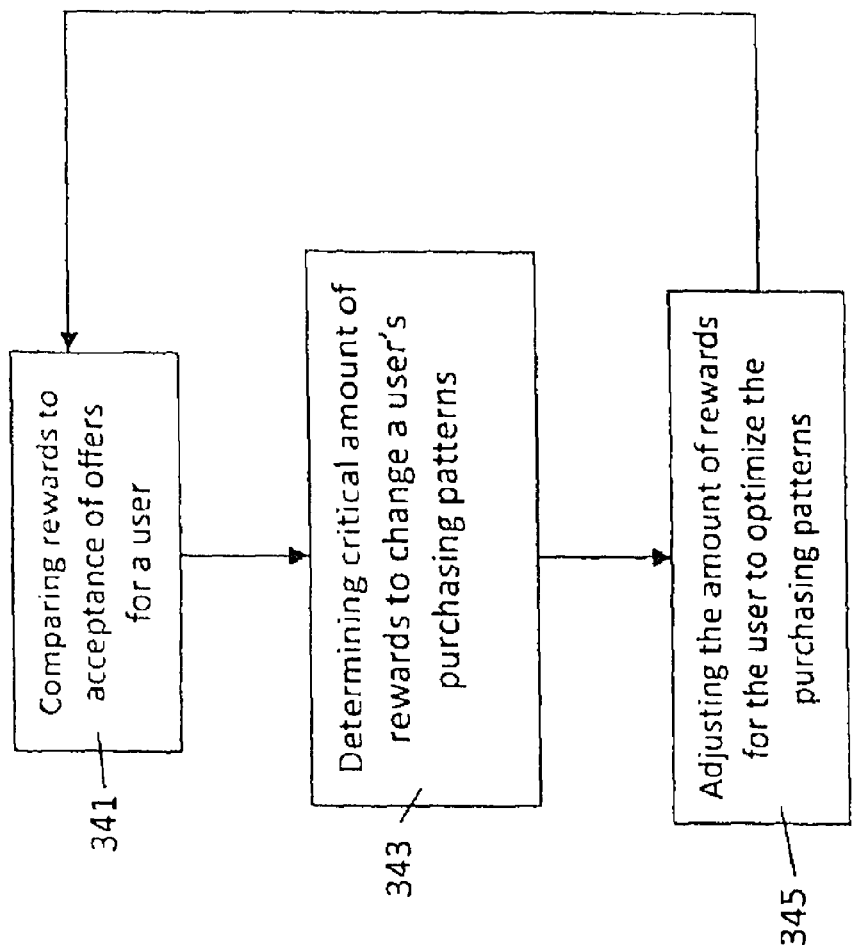
FIG. 7 illustrates a flowchart for adjusting the rewards transmitted to cell phone users.

With reference to FIG. 7, a flowchart is shown that describes the iterative trial and error process by which the rewards are optimized for each system user. The system can review the rewards, purchases and time/date of purchases 341. The system can determine the critical amount of rewards required to change the user's purchasing patterns 343. The system can also determine the times and dates that have the highest rate of changing the user's purchasing patterns. Based upon the amounts and also possibly the times/dates of best results, the inventive system can adjust the amount of the transmitted rewards for the user to optimize the purchasing patterns 345. The optimum purchase pattern can be the optimum return on advertising. For example, large discounts can be given to users if these uses react by making large quantities of purchases. In contrast, large discounts may not be given to users who make small quantities of purchases even after being given large discounts.

The system accumulates and records the points and discounts obtained by the customer. The system also allows the customer to easily redeem the points and discounts. It is well-known that a significant percentage of rebates are never redeemed. While these unused rebates are profitable for companies providing the rebates in the short-term, it can cause frustration for consumers, who lose the rebate value. This loss can result in a poor customer experience, and thus lead to the loss of valuable customers in the long-run. Since the rewards and points are all awarded electronically, consumers can simply redeem points by tapping on a "redeem" button on the GUI displayed on their cell phone screen (or click online on a web page). In response to the redeem command, the users can receive the point value as a discount in the next transaction at the store they choose, or in the form of virtual items. Because the redemption process is greatly simplified and automated in comparison to rebates that require forms to be filled out and proof of purchases to be mailed, the percentage of unredeemed points will be substantially lower with the inventive system and the customer experience should be greatly improved.

For example, after accumulating points, consumers can turn points into future discounts at all participating retailers or partners (or into virtual items). In an embodiment, the user interface can display the offers or rewards on the cell phone display. The user can tap on a specific amount of points they want to redeem, e.g. "100 Points", on their mobile phone in the inventive system service, and a message is transmitted to the MOBshop system service that 100 points should be turned into a discount at the next purchase at any or a specific retailer. For example, 100 points may, for example, be worth a discount of $1. This discount is automatically redeemed at the next purchase, with the methods described above.

In another example, after accumulating points, consumers can redeem points for charitable donations, for example to a charity of the consumer's choice from among a predetermined set of charities. In various embodiments, such charitable donations may be made on a monetary basis with a fixed exchange rate as described above, or may be made at a fixed number of points for an action performed by the charity. In some embodiments, donation totals for each of a set of predetermined charities may be accumulated during a time interval, such as one month, and a disbursement may be made to each respective charity (which may be subject to minimum amounts, which if not met may result in continued accrual) at the end of each such time interval, for the amount accrued within the time interval.

Figure 8:
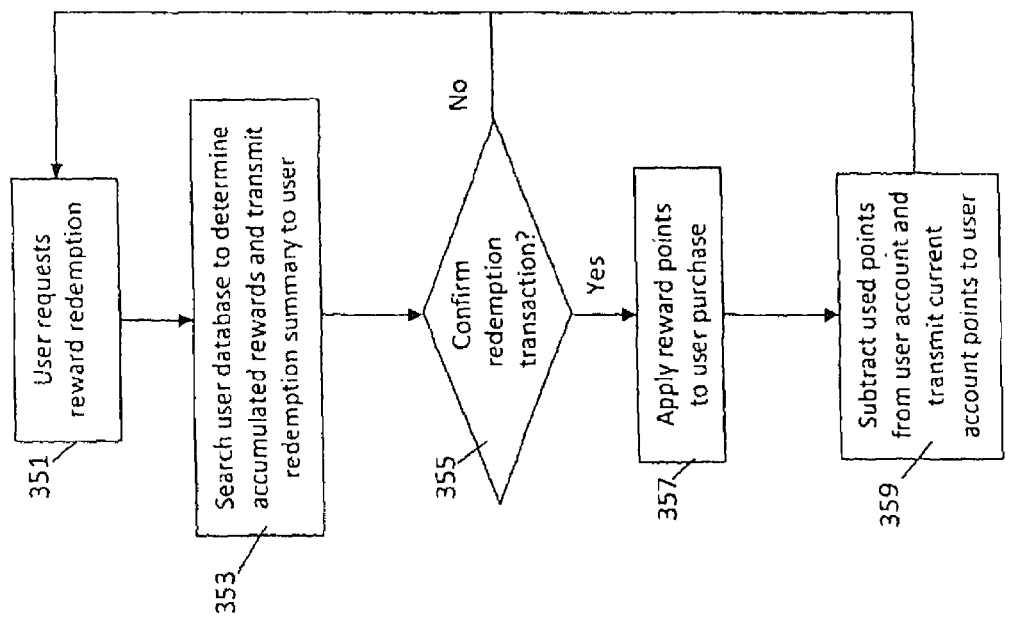
FIG. 8 illustrates a flowchart for redeeming the rewards by cell phone users.

With reference to FIG. 8, a flow chart describing a process for offer redemptions is illustrated. As described above, the user requests the reward redemption 351. The system can search the user database to determine if the requested quantity of points is available in the accumulated rewards for redemption. The system can then transmit a summary of the points that will be used and the discount or rebate that will be applied 353. The user can have an opportunity to review and confirm the transaction 355. If the transaction is cancelled, the system will wait for the next request for reward redemption. If the transaction is confirmed, the system will apply the reward points to the user purchase 357. This can be done at the point of purchase after the store confirms the purchase (via a connection to the store's POS system), and the system can transmit the discount which can be applied at the cash register. Alternatively, the system can apply a rebate for the purchase discount that is transmitted to the user and may be redeemed at a terminal or through a rebate mailed to the user. Once the transaction is complete, the system subtracts the used points from the user's account and transmits a current account points to the user's cell phone and/or the system's web site under the user's page 359.

C. In-Store-Location-Based Offers and Rewards

Location-based special offers also can be made in front of specific goods, aisles or locations in the store. For specific offers on goods, the system may determine that the user is in close proximity to the product. For example, if a customer is detected in music section, an offer may be transmitted for 50% off one CD when he/she buys two; or, when the customer is walking in the large appliance area, free home delivery may be offered. The offers may change when the customer comes back a second or third time (e.g. increasing or decreasing incentives). The offers are personalized as mentioned before, so they may vary depending upon the customer and products.

The exact location triggers for in-store location determination can include: WiFi triangulation, NFC (Near Field Communication) technology, accelerometers and/or compass data processing, user input of in-store location or shopping aisle, or any other current or future source of location information. In an embodiment, a special system proximity transmitter can be placed by the goods. When the user walks within the range of the proximity transmitter, the system can be triggered to display the offer for the goods. The transmitter can be part of a personal area network which can utilize for example IrDA, Bluetooth, UWB, Z-Wave or ZigBee. Alternatively, it can be an ultrasonic sound (see threshold entry detection methods described above). By placing the transceiver close to the goods, this method ensures that the offer will be received when the customer is at the proper location.

D. Personalized Offers with Automatic Discount Redemption

The offers are personalized via matching of available individual profile data sets. Examples of individual profile data include: location; explicitly stated preferences, such as favorite stores and items, wish list products and implicitly inferred user preferences, such as favorite product categories or items or stores, based on clicks on items or stores. Individual profile data can also include "walk" history. For example, consumers who walk into high-end stores continuously are either high-value spenders or "fashionistas," i.e. persons interested in fashion trends. Individual profile data can also include: age, gender and demographic. This can be important in presenting offers. For example, young people who do not have children generally do not want offers for infant goods. Profile data can also include previous shopping history, registered user information, such as demographic information including: birth date, income, marital status, address and other information. In an embodiment, the profile data can be used to determine the most relevant offers and rewards that are most likely to be accepted by the consumers based on a matching algorithm that assigns a weighted score to each offer based on the individual's profile data set.

For example, if the system knows that the customer is a 25 year old male who makes $50K per year and bought an iPod touch 2 weeks ago, it will compare this purchase to a database of system users and determine that a majority of people in this demographic purchased iPod accessories within one month of purchasing the iPod. Based upon this analysis, the system will determine that speakers, headphones and car charging systems are the most relevant products to the customer and transmit offers for this specific type of goods. In another example, the system can determine that a 38 year old woman who makes $95K per year who frequently visits (walks in and out of, or makes purchases at) a set of fashion stores is likely to be interested in offers from other fashion stores that other women visit who have similar profiles and who also frequently walk in and out of the same stores the woman walks into.

The invention provides a method of assigning offers and/or rewards to at least one user, comprising the steps of: 1) Receiving location information about a user from his/her mobile phone, and 2) Matching available individual profile data sets, e.g. location; explicitly stated preferences, e.g. favorite stores and items, wish list products; and implicitly inferred user preferences, such as favorite product categories or items or stores, based on click (on items or stores) or "walk" history (e.g. consumers who walk into high-end stores continuously are either high-value spenders or could be "fashionistas"), or based on gender and demographic; previous shopping history, registered user information, such as demographic information, (e.g. gender, birth date, income, marital status, address) with retail offers and information, to determine the most relevant information to the consumers based on a matching algorithm that assigns a weighted score to each offer based on the individual's profile data set.

In an embodiment, the algorithm can be:

Weighted Matching Score(WMS)=30%$A$+20%$B$+15%$C$+5%$D$+20%$E$+5%$F$+5%$G$

Where:
A=distance_from_store
B=gender_factor_for_product
C=age_match_to_product
D=favorite_category
E=favorite_product
F=previous_clicks_on_product
G=friend_recommendations The higher the matching score for each of the weighted elements, the higher the total score, and therefore the total match factor for the product (and the recommendation ranking to the individual user in that moment). In embodiments, each of the factors A-G can range from 0 to 10.

A factor is the user's distance_from_store factor. The factor decreases with the distance from the store. In an embodiment, the system can calculate the distance_from_store factor based upon the road distance the individual is from the store where the product is sold. See Table 3.

TABLE 3

| Road Distance between user and store | distance_from_store factor |
| --- | --- |
| Less than 1 mile | 10 |
| 1-2 miles | 9 |
| 3-4 miles | 8 |
| 5-9 miles | 7 |
| 10-15 miles | 6 |
| 16-20 miles | 5 |
| 21-30 miles | 4 |
| 31-50 miles | 3 |
| 51-90 miles | 2 |
| 90+ miles | 1 |

In another embodiment, the rewards offered may increase with the distance from the store, to entice consumers to drive there. This depends on the store's policies and marketing objectives, or on MOBshop's objectives.

The gender factor can have fewer factor variations. If the product is predominantly purchased by men by a ratio of 2 to 1, the gender_factor_for_product can be 10 for men and 5 for women. The gender factor can vary for each product and can be based upon the purchase ratio determined by purchase research or estimated gender interest.

Another factor is the age association for the product. For example, a high age_match_to_product factor is assigned if the product is usually bought by user profiles in a similar age group. For example, if the product was normally purchased by people between the ages of 21-25 years and the user is in this age bracket the age_match_to_product factor can be 10. As the age of the user differs from the age of the people who would normally purchase this product, the age_match_to_product factor decreases. TABLE 4 below provides an example of the decrease in the factor.

TABLE 4

| User Age | age_match_to_product factor |
| --- | --- |
| Less than 9 | 0 |
| 11-12 | 4 |
| 13-15 | 6 |
| 16-20 | 8 |
| 21-25 | 10 |
| 26-30 | 9 |
| 31-35 | 8 |
| 36-40 | 7 |
| 41-45 | 6 |
| 46-50 | 5 |
| 51-55 | 4 |
| 56-60 | 3 |
| 61-70 | 2 |
| 71+ | 1 |

The factor values for favorite_category can be determined by looking at the user's past purchase history. If the majority of the prior purchased products are in the same category, this factor will be very high. Purchases made in related product categories will have a lower factor and if most of the user's purchases are made in an unrelated category, the favorite category will have a very low rating. Similarly, the favorite_product factor can be determined by comparing the product to the user's past purchases with a higher value given to closely related products. The previous_clicks_on_product can be determined by the number of clicks the user has made on the product information. A higher value is provided for a higher number of clicks. Finally, the friend_recommendations factor can be proportional to the number of friends who recommend the product to the user.

Since, the example algorithm is based upon percentages that are applied to each factor and a total of 100%, the weighted matching score will be a value between 0 and 10. In other embodiments, other algorithms can be used with different factor values and different weighted matching scores. It may also be used to drive products into new user categories, e.g. by purposefully assigning higher match factors to consumer groups that have previously NOT bought the product or service frequently, leading to special offers provided to those groups. The algorithm can also be periodically adjusted as the system determines the best correlation between the listed factors or other factors and the likelihood of purchasing the products. The algorithm can be applied to a number of products being sold by a store and presented to the user in a descending order with the highest weighted matching score being presented first.

Based upon the weighted matching scores for various products, the system can cause the cell phone to display the most relevant retail offers and information. The system may transmit the offer information to the user's cell phone or alternatively, the offers may already be stored on the cell phone. The weighted matching scores can also be used to assign the personalized offers and rewards (such as reward points) based on the specific location such being in the proximity of a retail store, in the proximity of a store competitor, approaching a retail store from a roadway, presence within the retail store. Note that where the product is inappropriate for a user or already been purchased by the user recently, the system can assign a 0 value or other factor that can prevent the product offer from being given to the user. The system can be configured to detect 0 value factors or other cancel indicators and remove these product offers.

Figure 9:
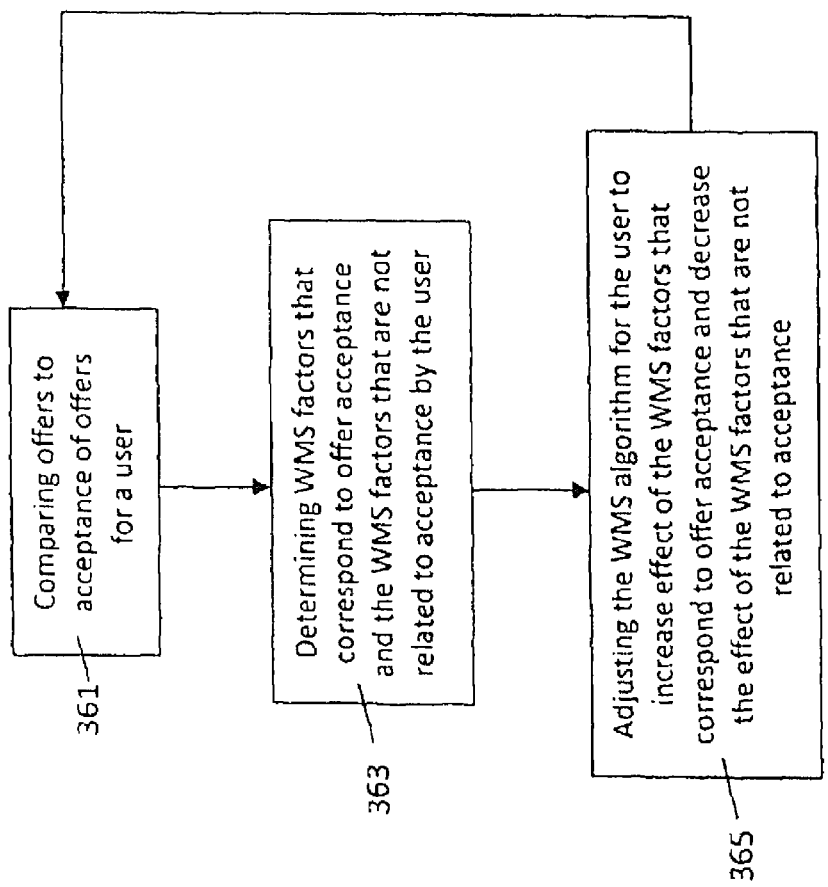
FIG. 9 illustrates an adjustment of an algorithm used to determine the relevance of offers.

Although the WMS algorithm is defined in an embodiment, the algorithm can also be adjusted to each user in order to improve the relevance of the offers. With reference to FIG. 9, a flowchart is illustrated that shows the process for adjusting the WMS algorithm. The system first compares the offers to acceptance of offers for a user 361. The system can determine the WMS facts that correspond to the offers being accepted by the user and the factors that are not related to the acceptance by the user 363. Based upon this information, the system can adjust the WMS algorithm applied to each user or groups of users so that the factors that are more closely related to acceptance are weighted more heavily and the factors that are unrelated to the user acceptance are less weighted 365. By adjusting the weighting of the factors, the algorithm can be tailored to the specific purchase characteristics of the user.

In some embodiments, consumer behavior may be adaptively mapped to the behavior of other consumers, and recommendations may be made according to such mapping. Such a mapping may be combined with other criteria, such as distance from a store. Such mappings are known to those skilled in the art, and include collaborative filtering (for example item-to-item recommendations based on purchases of items identical or similar to those featured in a promotion, promotion redemption, favoriting and/or viewing, and/or shopping activities), nearest-neighbor analysis, the use of linear regression analysis, Slope One, Pearson Correlation, etc. Examples of recommendation systems that may be used (with item purchasing, promotion redemption, favoriting and/or viewing, and/or shopping activities used as inputs such as "ratings" in the literature) include those discussed in Daniel Lemire et al, "Slope One Predictors for Online Rating-Based Collaborative Filtering," SIAM Data Mining '05 (April 2005); Yehuda Koren, "The BellKor Solution to the Netflix Grand Prize," Netflix Corporation (August 2009); Amar Saric et al, "Alternative Formulas for Rating Prediction Using Collaborative Filtering," Proceedings of ISMIS (Springer, 2009); Jonathan L. Herlocker et al, "Evaluating Collaborative Filtering Recommender Systems," ACM Transactions on Information Systems, Volume 22, No. 1 (January 2004); and G. Adomavicius et al, "Toward the Next Generation of Recommender Systems: a Survey of the State-of-the-Art and Possible Extensions," IEEE Transactions on Knowledge and Data Engineering, Volume 17, Issue 6 (June 2005), all of which are incorporated herein by reference in their entirety for all purposes.

In some embodiments, a first promotion may be used as a proxy for a second promotion based on similarity in specification parameters associated with the promotions (such as category, subcategory, price, retailer, etc.) and/or textual similarity (e.g. an exact match, or an approximate match such as an edit distance calculation). For example, a first promotion about which inadequate information has been gathered to make good recommendations (for example a recently-entered promotion, such as a promotion created less than a day ago, or a promotion that has been presented to relatively few users, such as less than a hundred or a thousand users) may be determined to be similar to a second promotion, and those users for whom the second promotion is determined to be a good recommendation (for example, based on their behavior as described above) may be presented with the first promotion.

Figure 10:
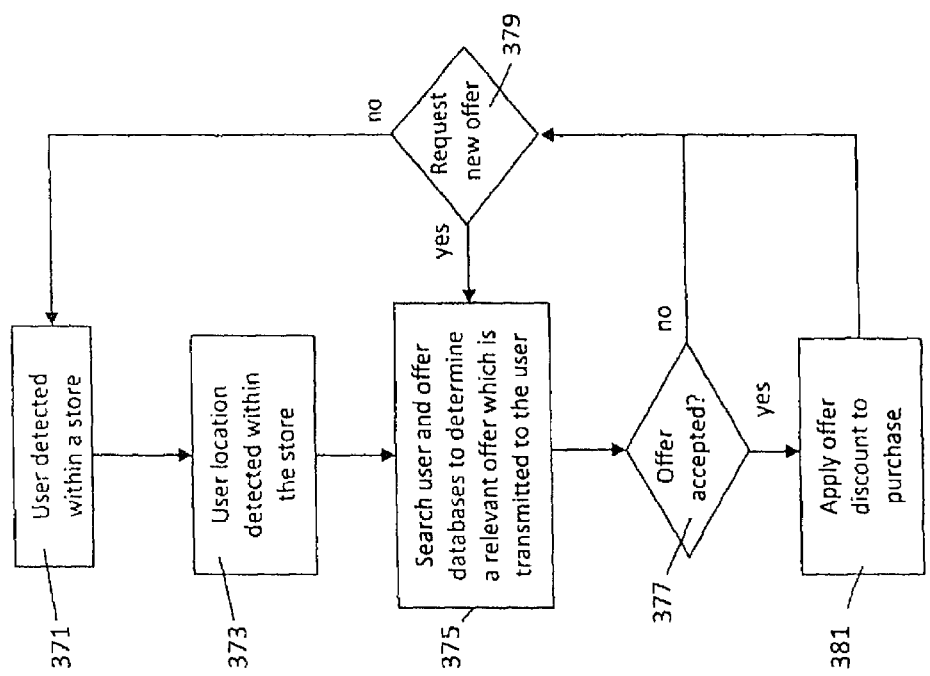
FIG. 10 illustrates a flowchart for transmitting the rewards to cell phone users.

With reference to FIG. 10, a flowchart describing the steps used to transmit offers to the user are illustrated. The user location is detected as being within a store by any of the methods described above 371. Within the store, the user location is further determined by any of the methods described above 373. The system searches the user and offer databases to determine a relevant offer and transmits the offer to the user 375. The offer relevance can be determined based upon the WMS algorithm described above. The offer is accepted or rejected by the user 377. Some offers can also be saved and used later. If the offer is rejected, the user can ask the system for another offer 379. The system can research the user and offer databases to determine a relevant offer and transmits the offer to the user 375. If the offer is accepted, the system can apply the discount to the purchase 381.

In an embodiment, the personalized discount process of the inventive rewards program and redemption methods are automated. In preferred embodiments, electronic credits are applied based on the consumer's identification at POS by cell phone number, credit/debit/store card number, store loyalty card number or other forms of identification. In order to make the identification possible, the customer pre-registers on the MOBshop service (via mobile or online app or website) a) his/her credit/debit/stored value or store loyalty card number(s) to be used for MOBshop discounts, or b) his/her cell phone or other phone number, or c) any combination of the above.

The customer can then apply the discounts and points through pass-through credits of discounts to consumers' credit or debit or store cards that they have previously registered with the mobile service. In this embodiment, the customer may have to pay the full price to the store, but the discounts and points are credited to the customer's credit/ debit or store card. The consumer may be informed by mobile phone message that the discount was credited to their credit/debit/store card account. In another embodiment, the inventive discount system is integrated with retailers' POS systems and the discounts and points are automatically deducted from the total tally at the time of purchase.

In an embodiment, a method for automatic redemption of personalized offers at the POS or after the purchase, occur via any one or more of the following processes: a) pass-through credits of discounts to consumers' credit or debit or store cards that they have previously registered with the mobile service, b) via integration with retailers' POS systems and automatic deduction from the total tally at the time of purchase, c) via POS payment terminals through reduction of the total amounts, d) via pass-through to stored value cards.

The integration methods b) and c) above may occur via the following inventive procedures:

In an embodiment, the inventive system can be integrated and operate seamlessly with the POS system of the retail store. A customer identifies herself at the cashier terminal with one of the identification methods above (using a pre-registered card or entering a phone number or telling the cashier her phone number or other identification number or code). That identification as a "MOBshop user" then triggers a transaction log feed from the retailer to the inventive system service processor either live or in a batch mode. The log feed can be on an item level. For example, Jenny is buying these 5 items, a, b, c, d and e each with an SKU number and price; at the store #123 in Sacramento, Calif. The system then determines the applicable personalized total discount based on the individual's profile and the items in transaction log. If the feed is live and the retail store is communicating with the inventive system service processor while the transaction actually occurs at the POS, then the discount information is fed back live to the register, the register takes the discount off the total purchase, and the new adjusted total amount is updated on the customer's receipt.

In another embodiment of a live feed, the terminal may confirm the identification information supplied by a user with a server such as a MOBshop server, and receive an encoding of promotions for which that user is eligible. Examples of promotions for which a user is eligible include promotions that have been determined to be appropriate to the user, promotions which are applicable to all users, and/or promotions that have been presented to the user. An example of an encoding is a stream of zero or more identifiers such as SKUs corresponding to such promotions. The terminal may then apply any discounts that apply to the particular merchandise being purchased to the transaction. In such embodiments, a transactional feed may be provided (for example in batch mode) to MOBshop, and MOBshop may determine which promotions were used in the transaction, and may use this information for a variety of purposes, such as targeting which promotions to subsequently present to the user.

If the feed is not live, but delayed, or batched, or if the calculated personal discount information cannot be accepted live by the register, then the discount may be deemed as an adjustment by the retailer's or partner's POS system. The consumer can be informed through their cell phone (via the MOBshop service) of the discount that is charged back to her/his credit/debit card or store loyalty card. The system can be running as a cloud system connected to the retailer's or partner's data center, as a physical appliance in the retailer's or partner's data center, or in a separate hosting environment. Alternatively, the system can have software deployed at the POS register level or store processor level.

In another embodiment, the inventive system can be used with payment terminals. The payment terminal can be programmed so that when a credit/debit/store card is swiped at the POS, or a phone number or other MOBshop identification code is entered (see identification methods above), the terminal first calls out via a dial-up or IP connection to a gateway of the terminal provider to 1) check whether this card or number belongs to a system member, and 2) whether any discount should be subtracted from the total—this before the terminal makes the request for payment to a bank, e.g. an acquiring bank. To determine 1) and 2), the terminal provider's gateway electronically calls out to the inventive system and passes on the customer's card information which can be encrypted, for example via a hash key, and the total amount and store information. The inventive system then determines a personalized discount amount which can be ≥$0.00 for this transaction based on the customer's identification, profile, location and other factors, and returns the discount value to the payment gateway (via electronic communication). The payment gateway then electronically sends that information back to the terminal at the POS. Either the gateway sends a new adjusted total to the terminal, or the terminal is programmed to subtract discount information received from the payment gateway from the total purchase amount. The payment terminal then requests the new (potentially discounted) total amount from the bank (e.g. the acquiring bank), rather than the original amount. On the printout receipt from the payment terminal (if any), the personalized discount may be listed.

In an embodiment, IP-based payment terminals can be used to credit customers based upon the redeemed discounts and points. In this embodiment, the customer may pay the store the full amount of the purchases and the applied discount and point values can be redeemed through an IP-based payment terminal. This can be implemented in shopping malls where there are many system participant stores. The transactions can be recorded by the system at the point of purchase. The customer then goes to the terminal to receive the refund. Since the transaction is processed very quickly, by the time the customer gets to the IP-based payment terminal, the payment value can be processed and ready for pick up by the customer.

Alternatively, when the customer makes a purchase, the store may apply the discounts and points to determine a monetary value. The system or the store can then provide stored value cards such as gift cards that can be used as a form of payment for future purchases at the store. Alternatively, the card can be used at all participating stores (closed loop card), or at most stores, including those that are not participating in the system service (open loop card). The system can include a network that has multiple retailers and not just one chain of stores, therefore, the offers from the various retailers can drive foot traffic from one retail category to another, e.g. from a coffee shop to an electronics retailer and vice versa.

In an embodiment, the inventive system can also track the time of day and habits of the customer. For example, the system may notice that food items are typically purchased at noon if the user is at a shopping mall. In order to adapt to this characteristic, discounts for lunch can be offered at 11:45. The system can determine that the customer is in a mall and transmit coupons for discounts or coupons for a vendor at the food court in the mall. The system can also determine if the user is traveling based upon the speed and location of the customer. If the system detects that the customer is moving at more than 50 MPH on a freeway for 3 hours, it can predict that the customer is driving. The system can then transmit offers for up-coming roadside food if the customer is between cities. In other embodiments, the timing of the offers can correspond to paydays. Employees tend to get paid on the first day and fifteenth day of the month. By providing offers soon after the pay days, the members may be more inclined to accept offers after they receive a paycheck.

The inventive system will also store consumer profiles, track the purchasing behavior, and thus, continuously improve the offer and information targeting and relevance to the user. The customer profile can include: gender, age, friends, residence type and location, disposable income, mortgage, purchasing history, vehicles owned, favorite stores, favorite items, favorite shopping categories, other personal preferences, etc. Customer information can be obtained in various different ways. The information can be manually input or obtained from other sources such as social network information pages. The customer may have the option of blocking some personal information from the inventive system. In addition to personal profile information, the user can input offer preferences. For example, the customer may only be interested in car accessories, consumer electronics and sporting goods and may wish to block home improvement goods.

When purchases are made by the customer, the inventive system will record the purchases by SKU numbers, or in another form on the item level, if the data is made available by the retail store. The purchased goods can then be categorized and the customer's profile stored in the system database can be updated. In addition to personal profile updates, the system can produce a cumulative database of buying trends based upon customer profiles and demographics. Using one or more of the profile data inputs, the database can be searched and statistical data can be obtained which can be used to predict what the customer might purchase in the future. This information is particularly important in determining the relevance of offers transmitted to each customer. Each of the input factors can be weighted differently depending upon the customer.

For example, the inventive system may determine that a customer has a preference for high end stereo equipment based upon purchases made in the last 12 months. The system may determine that the customer has a significant disposable income and may test the customer's response to offers for high end designer clothing. If these offers are accepted, the system will continue to make these types of offers. Alternatively, the offers may be ignored or the customer may manually input a block against high end clothing offers. The system will update the user's profile and go back to offers that the customer has authorized.

If the system notices significant changes in purchasing, the system can detect changes in purchasing habits and adjust the offers accordingly. For example, if the system detects that the customer has less disposable income, offers for more practical goods such as consumable staple products can be transmitted. The system can predict disposable income levels by monitoring the spending habits of the user. Conversely, if the system detects higher levels of disposable income, the system can transmit offers for luxury items.

In addition to producing offers that are targeted towards customers' interests, the information can also be used to influence purchases made by consumers. For example, these offers and rewards can lead to desired effects such as brand switching, up-selling, larger basket size and margin, improved retail store experience for the consumer, increased store loyalty, consumer "stickiness" which will result in repeat visits by the consumer, or a shared positive experience. For example, if the system detects that a customer is shopping at fashion store A for clothing, but fashion store A is not participating in the inventive system as a partner, then the system can attempt to change the buying habits by offering discounts on similar goods such as fashion store B clothing, as fashion store B is part of the inventive system. The inventive system can also offer fashion store B discounts or offers when the consumer gets close to fashion store A (location-based competitive offers), if the consumer and the fashion store B have opted in to or requested such offers. The inventive system can also attempt to convert consumers to buy higher end and more profitable lines of goods. For example, if the system detects that a user has purchased multiple lower-priced patio furniture products from brand D, then it might suggest other higher-value items from brand D.

E. User-Generated Shopping Information and Services

Studies show that consumers who ask their trusted friends for advice are not only more likely to actually complete a purchase, but they also enjoy their shopping experience more. In order to engage customers and their friends, the inventive system can have additional, "social offers" that are shared by the shoppers' friends and can result in a viral expansion of the retailer's customer base. In order to encourage communications about purchases, the inventive system can award points to customers for their social network activity related to stores, products and purchasing.

For example, in an embodiment, the inventive system can include a "friend shopping feeds" a feature wherein consumers can post specific savings they made, or offers they find useful, to specific friends or certain groups of users on the service. Every time those friends click on such an offer, the poster receives a reward such as points or an additional discount. In an embodiment, the distribution of the offer can have multiple layers and provide rewards to each level. The system can track the line of purchases made and provide points for each level. For example, 5 points can be awarded to an offer poster for each purchase made by a direct contact, 4 points can be awarded for an offer accepted by a friend of a friend. The points can continue to be distributed and accumulated by customers as the offer is transmitted to additional groups of friends. Since the points have value, there is a strong incentive for spreading the offers to friends of friends and increase the viral effect.

In some embodiments, a "team" may be composed of a user who is the team "leader" and selected other users of the system, for example a user's friends, or users selected from among the user's friends, or from among other users. Such teams may be restricted to a maximum team size, which in some embodiments may relate to a "level" associated with the team leader, for example a level corresponding to a number of points that the user has accrued. For example, a higher level may correspond to a higher maximum team size. In some embodiments, a team member, such as the team leader and/or other team members, may be rewarded for activities of the other team members, or of the entire team. For example, a reward may be a point award equal to a function applied to all points awarded to team members (such as 100%, or 50%, or 10%, or a percentage awarded for activity exceeding a threshold within a time period).

In addition to points for posting offers, additional behavior can be rewarded. In an embodiment, rewards are provided for generating information useful to the inventive system such as producing a lay out of a store ("store floor plan"). The system can have a graphical user interface that allows a floor plan of a store to be produced on a mobile phone. In an embodiment, the cell phone software includes a program for creating user-generated store floor plans by simply shifting around "graphical blocks" that resemble product categories (e.g. Fashion, Outdoor, Food) on mobile phone touchscreens. Once the layout is complete, the layout information is transmitted to the system server, and then made available to other consumers. In exchange for an accurate floorplan layout, points or discount offers can be transmitted to the producer of the store layout.

Figure 11:
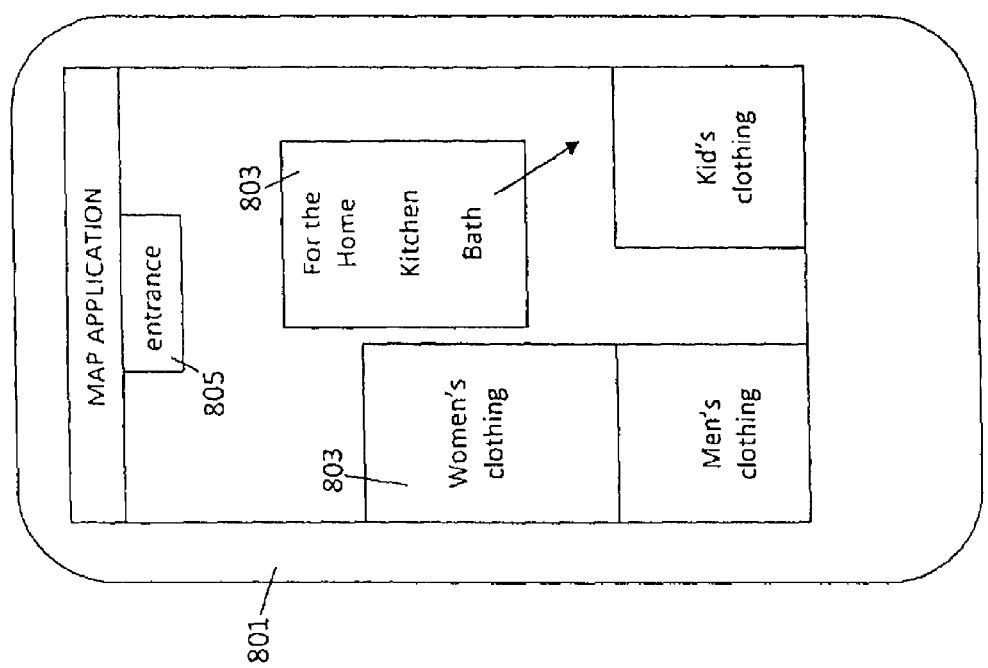
FIG. 11 illustrates a map application used to create maps of stores.

With reference to FIG. 11, an embodiment of the map application is illustrated. The user can map out a basic shape of the store 801 and within the store the basic shapes of the different department areas 803 are formed using the GUI. The user can move the department areas 803 around within the store 801 and designate the entrance 805 in a drag and drop manner until the map is complete. The completed map is then transmitted to the system server. Once the system has the store layout, it can transmit the store layout to the customer cell phones when they are detected within the store and a map is requested. When a customer walks into a store, the floor plan can be displayed so that the user can quickly find the goods of interest, or the consumer can type in a product, and a certain section of the floor plan where the product is located is highlighted. If location detection is accurate within the store, the interface can display the user's location and provide guidance for getting to a desire product area or department.

In an embodiment, the system includes a mechanism for consumers to involve different groups of friends that can be accessed for different types of purchases. The GUI may allow users to interact with each of the different groups with one button on their phone. The friends can be accessed to enhance the shopping experience based on which type of store the consumer is shopping. For example, the user can configure the system to have 3 specific friends selected from the phone book when shopping for electronics, 5 different friends for fashion. In another embodiment, the system can automatically suggest the friends who might be able to provide advice when the consumer taps an "ask my friends for advice" button or passes on a promotion to relevant friends' mobile phones. In this embodiment, the system can review purchases made by phone book friends and determine if any recent purchases have been made in the same general category such as consumer electronics or specific products such as digital cameras.

In an embodiment, the system GUI can also allow a customer to communicate directly with a social network that is available through the application as part of the social features. The social network of the inventive system can be integrated with other social networks such as Facebook, Twitter, MySpace, Hi5, Bebo, Orkut. In addition to leveraging the existing "social graph" of these networks to build the user base, users thereby can also communicate with friends about shopping-related topics or specific products or offers, who are not currently using the mobile inventive system application but who are on the social networks.

In an embodiment, a system user can customize the social networks based upon different categories of friends, such as "fashion friends" "consumer electronics friends" "school friends," "work friends" etc. The system can automatically detect which friends to set as a default based upon location, time and date. The system can switch to fashion friends when the user is detected in a clothing store or clothing department of a department store. Consumer electronics can selected when the user is in a consumer electronics store. Similarly, school or work friends can be selected during school/work days and hours, Mon-Friday, 8 AM to 6 PM. The inventive system can allow the user to override the default to send messages to any selected group or combination of groups.

The system user can then use these categories to control the dissemination of information. The inventive system will also be able to see how each user has chosen to group their friends. The inventive system will have the ability to send out promotional offers, discounts, product recommendations, reviews, ratings and product photos. In some cases the system can automatically transmit rewards to users who are in these groupings, while retaining the privacy of the individual user information. The system can also include features that allow users to easily share information, offers and advice.

For example, the customer A may find a great deal on a computer and although she does not need a computer, she knows that many of her consumer electronics friends may want one at the sale price. Customer A is in a computer electronics store and the system has set computer electronic friends as default. Customer A selects the transmit feature to send the offers and discounts to her consumer electronics friends. These consumer electronics friends can then either accept, ignore or resend the offers and discounts to groups of their friends. The system can track the origin of the offer and provide incentives for transmitting and accepting the offers. In an embodiment, customer A can receive points for sending the offer and additional points for any friends and/or friends of friends who accept and/or use the offer. Customer A may not need the product because she already owns and likes the product. In addition to sending the offer, she can provide positive product reviews and ratings. A customer can also take a picture of the product and post the picture with the product review/rating. The positive information can also be stored and accessed for social network purchase advice. The system can associate the positive review/rating from customer A with the products SKU and any other friend who would like to access purchasing advice information for the product can access this information.

Figure 12:
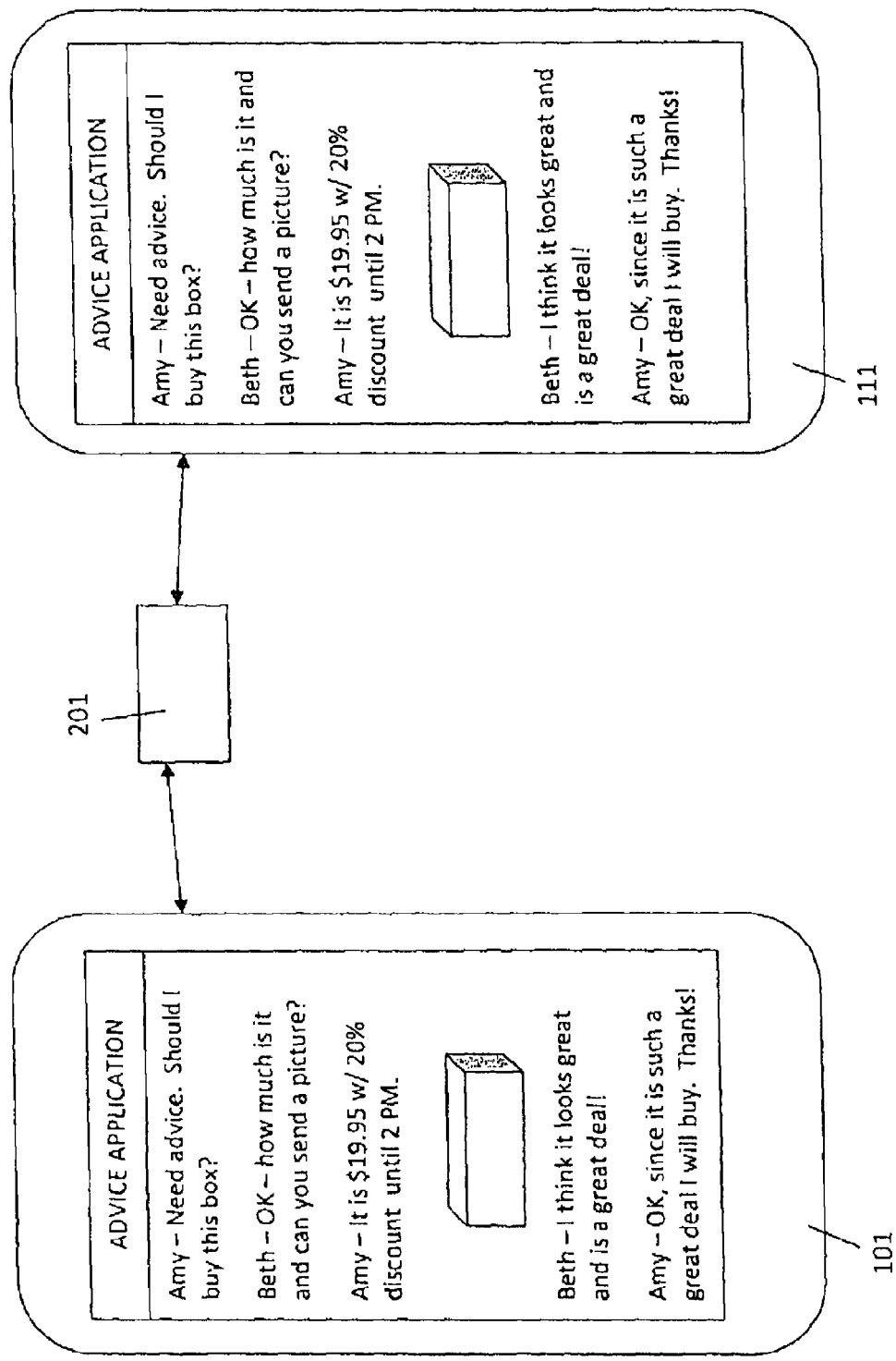
FIG. 12 illustrates the social network interaction between cell phone users.

With reference to FIG. 12, a social network interaction between two cell phones 101, 111 is illustrated with the advice application running through the social network. A first user requests advice. The request is sent through the server 201 to one or more other user cell phones 111. The second user 201 agrees to assist and the first user 101 transmits information about the potential purchase. Based upon the product information, the second user 111 recommends the purchase. The first user thanks the second user for the advice and may proceed to make the purchase. Since the system server 201 knows that the first user is at the store based upon the location and content of the communications, it can award points for communications related to a purchase to the first and second users.

Points can be awarded to customer A for posting the review/rating (positive or negative) and additional points for purchases of the product based upon the review/rating and/or store visits from friends based upon the product review. By giving away something of value for activities that are not excessively time consuming or difficult, consumers are encouraged to visit stores and make purchases and perform shopping and social network activities. For example, points can be awarded for consumer based social network activities including communications about store products, store purchases and store visits by social network friends. In addition to direct product information, points can be awarded for other related activities. For example, as discussed above, maps of the stores can be generated by users through the user interface on the mobile device. Points can be awarded for generating maps that indicate the locations of product departments or specific goods.

F. System Architecture

With reference to FIG. 1, the inventive system includes a server 201 that communicates with mobile devices 101 owned by consumers through one or more networks including: the internet 222, cellular networks 219, LAN, WiFi. etc. The server can provide various different services including: software downloads and the described system offer/rewards/social network features. In order to perform the described functionality, the system server 201 is coupled to several databases 203 which can include: customer database, purchase database, store database, offer database, etc. When consumers become system members, they download the required software to the phones 101 provided by application server 201. The user can browse through the software and select the system application that is compatible with the user's mobile device 101. When the software is selected, the server 201 accesses the software database 203 and transmits the software. The phone 101 can be coupled to a computer 115 having a microprocessor 314 ruing an operating system 316 and software 318 and memory 320 for storing the software and data. In an embodiment, the system software can be downloaded through a network to the user's computer 115. Alternatively, the software can be transmitted by the cellular network directly to the mobile device 101 using the mobile device graphical user interface.

Once the software is downloaded, the consumer will also provide information that is stored in the service's database on the application server as consumer account and behavior data. The user may have to provide information and may select preferences. For example, the system may ask permission to access social network for personal information, store frequent shopper data, credit card information, etc. This access to other systems simplifies the set up process because the customer data already provided to these services is automatically downloaded to the system. However, the user may not wish to allow access and can opt out of providing this access permission. The personal information can be entered manually through an input device on the cell phone 101 or a computer 115 and transmitted to the server 201 which processes the information and stores in the user database 203.

When the system software is set up on the user's mobile phone 101, the service's GUI provides shopping information to the customer including: a) accumulated points or coins for activities including walking into stores, b) dollars saved today/total displayed is another possible embodiment of the invention and c) system status displayed—Rookie, Amateur, Expert, etc. The status may change based on rules, for example based upon purchase volume and/or frequency of store visits and/or social shopping activity with friends, and/or how well the customer knows/utilizes all the system features.

In an embodiment, the inventive system has an offer and rewards filter placed over the GUI that will provides rules on how the rewards, discounts, offers are disseminated to these customers with different levels of shopping frequency and average purchase volume. The system can provide a geographic deal finder with a map(s) showing deals and offers in the area. The system can provide additional details through the GUI such as all member stores in the area and maps with directions to get to the stores. The system can also provide points to users in exchange for mapping out the physical setting of the store in terms of categories of goods stocked in the stores.

The inventive system can also provide additional services to system members. For example, some hard to find items can be reserved by system members so they do not have to wait in line to get a limited allotment of these goods. In an embodiment, the priority for the hard to find items can be based upon the "level" of the member with new members having a lower priority than higher or elite level members. The system can also produce special member offers such as: new items, rare items, surprise gifts, in-store events, sneak previews, special store hours and end of offer warnings. In some cases, these offers may be bundled and all run out at the same time. This offer can be transmitted to the member's cell phone in a text message. For example, "You can save $14.28 on your favorite groceries if you shop before 4 pm tomorrow. After this time, all these discounts will expire."

In some embodiments, a badge may be awarded for activity meeting a certain criterion or set of criteria. For example, a badge may correspond to entering or checking into a certain kind of store, or entering or checking in during a certain date, or redeeming a certain offer or type of offer, or entering a certain store at least a threshold number of times, or entering at least a threshold number of different stores, or different types of stores, etc. Such badges may be displayed as part of a user's profile, and in some embodiments may enable additional functionality, such as increased points for entering a store, a relaxation on restrictions applying to points awards, etc.

Some system members can also have the option of a personal shopper. For example, the user can be greeted by store managers (opt-in only) when notified of arrival. For example, the best customers might see a special button on the service that says "Personal shopper?" When they tap on it, a message is dispatched to the store staff that customer A is arriving. The system can also transmit shopping information about the customer. Based upon the stored data, the system may know that the customer likes audio equipment, and the last purchase was $48 headphones. The store staff can then offer the latest audio equipment and guide the high-value customer through the store, thus improving the shopping experience, and likely increase the close rate, basket size and satisfaction level of the customer. Manual authentication is also another possibility, and the given retail partner could have a unique ID ready to hand out to system members after identifying themselves with a form of physical ID. The system user would then have to manually input this unique ID into their phone and proceed to receive personalized offers, discounts and rewards in that method.

In another embodiment, the inventive system can have a "wish list" feature that allows members to indicate items that he or she would like to purchase in the future. The consumer can enter specific items or categories she is looking for. For example, the user can enter, 32" LCD HDTV, and she will automatically see any offers for that item in the service. The system can also include deal search features that allow the member to search for deals and savings on the wish list items. This feature allows retail store to make offers based on purchase intent until the product is actually bought. So far, offline stores do not know any purchase intent for not regularly purchased items (e.g. a TV set), unless the customer talks to a sales person (but even then, the store cannot stay in touch with the consumer to keep following up until the consumer actually buys the TV). For example, TV sets are bought on average every 7 years by consumers, so previous purchases are not an option to determine that the consumer is "in the market" for a TV set. This inventive system allows the retailer to know exactly that. The inventive system can also include a calculator that allows the user to input the amount of money he or she can spend and the system will apply discounts/points to let you know what you can afford to buy. The system can also determine payment plans being offered by the store or credit card company and apply these interest rates to the cost of the goods minus any down payments, the calculator can determine the monthly payments necessary to purchase the wish list items.

As discussed, the inventive system monitors the customer's location to provide offers based upon the user's location. This location detection can also be used for location-based competitive offers. For example, if the system detected the consumer in the parking lot of a non-participating retailer A, the system can identify the type of store the consumer is visiting and transmit an offer for similar types of goods from a participating retail store that is close by. For example, if a member is in the parking lot of a consumer electronics store that is not a participating retailer, the system can try to determine the goods that the consumer is shopping for. This can possibly be a wish list item or on sale item. The system can immediately transmit an offer for these consumer electronics goods in an attempt to get the consumer to purchase the goods at the participating retailer store ("location-based competitive offers").

The system is also able to track the effectiveness of the location-based banner ads and make adjustments accordingly. Banner ads can be tracked down to the individual level and measure whether they have a desirable effect on store visits or not. By comparing control groups who do not see the banner ad on the service with groups that do see the banner ad, the store visit frequency of the two groups can be compared, and thus the efficiency of the banner ad evaluated.

In an embodiment, the inventive system can utilize additional features of the cell phone to enable additional system features. For example, the inventive system will constantly display offers to the system user. Frequently, the user will not accept the offer or in some situations, the user will want a different offer. In an embodiment, if the user does not like the offer, he or she can push a button and/or possibly shake the phone to cause a new different offer to be displayed. The system can detect the shaking motion with internal accelerometers and based upon this signal, the cell phone will understand that the original offer was not of interest to the customer and update the user profile. The user may be able to control some of the offer parameters by indicating that the user is interested in a specific product, brand, % discount, etc.

In order to provide entertainment, while utilizing the inventive system, the software can feature shopping games which provide challenges to the users. For example, the system can ask the user how fast can he or she can find all saved wish list items. The system can have a clock running and display the running time as the user finds the wish list items. When the task is completed, the system can display a cumulative time and indicate the relative speed compared to other system members or post the results to a social network web page for friends to view and attempt to improve upon. If necessary, the user can request the physical presence of the friends and points can be awarded to the friends if they go to the same store within a predetermined time.

Another feature of the inventive system is the recordation of the savings by using accepting the offers. The system can record savings cumulatively, for the day, month, year or for any other set period of time. Users can monitor their purchases and savings since this information can be automatically recorded in a purchase log. Other system games can include challenging each other to save the most. The system can record to a personal page or a social network page, users' record savings in one day and which friend got the best deal on wish list item?

In an embodiment, inventive system provides an Interactive GUI that includes various shipping features. Customer's frequently need directions to specific product locations within a store. In an embodiment, the system has a product search engine that would aid the system members looking for a particular item on aisle within the store. The user can input the product description and press a search button that provides directions. The directions can include a map of the store with the different categories of products on a map of the store. The map can also include the specific locations of the desired goods in the store and/or a description of the item location, such as Isle 4, Bin 14. If the system can detect the location of the customer the system can also provide specific directions, for example, turn right at home appliances and straight 100 feet until you get to the shoe department. If the user's location is known by the system, location based offers within store can also be transmitted to the user. In yet another embodiment, the system can simultaneously request customer service and a store employee can meet the customer at the product location to explain features and benefits of the product.

The inventive system can also have access to the store web site and/or product web site within a store as well as product reviews. When a specific product is searched, the system can transmit detailed reports on the products that are being offered on discount. The product information can include information from the store web site as well as the product web site. The user is also able to use the product review search to see what products their rewards points might be able to purchase right at that point. By having all of the information at the point of purchase, the user can make an educated purchase decision which enhances the shopping experience.

Many retail stores have club memberships which can also be integrated into the inventive system. The users can enter their store loyalty program numbers into the system application on the cell phone, and the application will automatically provide special offers or functionality reserved or only for the store's loyalty program members (e.g. extra $50 off for item A for loyalty program members of this store; special sneak preview of next week's offers only for members).

As discussed above, the system users are able to share information with their friends. In an embodiment, the inventive system has a Social Network GUI that facilitates this exchange of information. In an embodiment, the user can ask for advice by selecting a possible purchase product and pressing a button. The system will transmit the advice request to the selected friends or groups of friends. In exchange for their participation and assistance, they can each receive system points. The social network can also be used to post savings and share potential deals and offers with friends. In some cases, the deals can be exclusive and not sharable or the deals/offers may only be shared with a limited number of friends. The social network may allow users to pool or gift points so friends or groups of people can purchase the desired goods together or as a group gift. The social network also provides a simple platform to see what friends are buying. This can be important when purchasing compatible goods such as video games and accessories, latest fashion trends, replacement parts for previously purchased products, etc.

The social network also allows for improved game play between different system users and may allow users to increase their points.

G. Rules Engine

With reference to FIG. 1, the rules engine 117 is part of the system server 201 and manages the offers and discounts that are provided to the consumer. The rules engine 117 is the software and programming behind the interface that the system users will physically see when either running the application or during authentication, or at the point of redemption of the accumulated system points.

When a user first becomes a system member, the rules engine 117 processes the consumer information, including his or her demographic and location, date and time. The rules engine will also have access to the databases 203 for: merchant, products, brands, promotions, user data, offer postings and tracking of purchases.

The merchant data stored in the merchant database 203 can include: store location information, phone numbers, store hours, parking information, merchandise and inventory information, etc. The product database 203 can include descriptions, specification, pictures, size, instructions, compatibility, use requirements, retail price, brand information, etc. The promotions database 203 can include special discounts, discount qualifications, discount locations, discount dates, etc.

The user database 203 can include: demographic, behavior, transactions, points, status, level, etc. When a user first becomes a system member, certain of the information stored for the member may be input by the member. Once the basic information is input and stored, the system can track the behavior, transactions, points, status, etc. If changes are necessary, the user can edit the information through the cell phone input or by a system administrator.

The offer postings and tracking of purchases database 203 are used after the system is operating. The system presents and records offers for discounts and/or points. As offers are presented to the user, the system can track the purchases made through offers.

The points database records not only the points accumulated by the member, but also processes redemption of points for merchandise or the transfer or sharing of points. The rules engine will also award points to the consumer based upon consumer activities, as deemed by the system and the retailer. In this regard, the rules engine can manage a "points" "redemption" and "offers" database 203 that enables a user to convert accumulated points into merchandise and accept offers.

H. System Operation

The inventive system is flexible and can be configured to perform any of the described tasks. A typical implementation of the inventive system can be simply to provide offers and discounts which are incentives for customers to enter a store. For example, a customer may need a certain product and walks into a store and provides system program identification. In an embodiment, this information can be transmitted by the consumer by pressing a button on his or her mobile phone when the consumer enters a store. Alternatively, the member identification can be provided by: a mobile phone number, credit/debit/store card number, store loyalty card, etc. In order to simplify the identification process, card readers can be available to read the identification information from the cards.

Once the user is identified and in the store, the system can award points to the customer which are immediately recorded and displayed on the mobile phone for entering the store. When the customer enters the store, the customer location information is transmitted to rules engine. The rules engine identifies the store and returns offers for that store based upon that consumer's information. The offers are displayed on the mobile phone. The offers can vary by product and type of offer. For example, some offers can be limited time, some offers can be shared with member friends, some offers can be exclusive to the recipient, some offers can be sent/distributed not based on a particular level of member. A certain client may want to send out a promotional discount to all females social network friends, regardless of their level. Because the system can be configured in almost any manner, the user can control the distribution of offers. As the customer shops, additional points can be awarded for the time spent by the customer in the store.

The user can accept offers in different ways. In a preferred embodiment, the member brings the items to the cashier and provides system program identification. Alternatively, for example if the preferred item is out of stock at the physical store, the user can order the item through a mobile device and have the item delivered to user's home or another address from that retailer's online shopping division. The user can also ignore the offer or ask the system for different offers. When purchases are made using the offers, the discounts and point redemptions can be applied in various different ways. The system can also include security measures. For example, the system can request that the user provide the last 4-digits of their Social Security # or Zip-Code, in order to provide redemptions.

In the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of the present invention. One will appreciate that these steps are merely exemplary and are not meant to be limiting in any way. Other steps and functions may be contemplated without departing from this disclosure or the scope of the present invention.

What is claimed is:

1. A method, comprising:
   generating an identifier that identifies a retail store; and
   transmitting the identifier in the retail store using an ultrasonic signal transmitter that transmits using at least one ultrasonic frequency;
   wherein a server-side processor determines presence of a user at the retail store based on information received from a client-side application of a mobile phone of the user in response to reception of the transmitted ultrasonic signal at the mobile phone of the user, wherein the server-side processor provides the user a reward for presence in the retail store via the client-side application of the mobile phone of the user while the user is present at the retail store, and wherein the server-side processor facilitates varying the identifier transmitted by the transmitter according to a schedule.

2. The method of claim 1, further comprising encrypting the identifier.

3. The method of claim 1, wherein the identifier includes a time-varying component.

4. The method of claim 3, further comprising controlling the time-varying component using a real time clock.

5. The method of claim 3, further comprising receiving a broadcast time signal to control the time-varying component.

6. The method of claim 3, wherein the time-varying component includes a nonce.

7. The method of claim 3, wherein the time-varying component includes a timestamp.

8. The method of claim 3, wherein the time-varying component includes a rotating key.

9. The method of claim 1, wherein the identifier further identifies a department within the retail store.

10. The method of claim 1, wherein the identifier is associated with a component received from the server-side processor.

11. The method of claim 1, wherein the at least one ultrasonic frequency is between 19 KHz and 22 KHz.

12. The method of claim 1, wherein transmitting the identifier in the retail store using the ultrasonic signal transmitter includes transmitting the identifier using frequency shift keying.

13. The method of claim 1, wherein transmitting the identifier in the retail store using the ultrasonic signal transmitter includes transmitting the identifier using phase shift keying.

14. The method of claim 1, wherein transmitting the identifier in the retail store using the ultrasonic signal transmitter includes transmitting the identifier using amplitude shift keying.

15. The method of claim 1, wherein transmitting the identifier in the retail store via the ultrasonic signal transmitter includes transmitting the identifier using multifrequency signaling.

16. The method of claim 15, wherein the multifrequency signaling includes spread spectrum communications.

17. The method of claim 1, wherein the identifier includes an error correcting code calculated from a source data.

18. The method of claim 17, wherein the error correcting code is a turbo code.

19. The method of claim 17, wherein the error correcting code is a convolutional code.

20. The method of claim 17, wherein the error correcting code is a Reed-Solomon code.

21. The method of claim 1, wherein the identifier includes an error detecting code calculated from a source data.

22. The method of claim 21, wherein the error detecting code includes a cyclic redundancy check.

23. The method of claim 1, wherein the ultrasonic signal transmitter includes a transducer.

24. A system, comprising:
a signal generator configured to generate an ultrasonic signal comprising an identifier that identifies a retail store and having at least one ultrasonic frequency; and
an ultrasonic transducer configured to transmit the ultrasonic signal in the retail store;
wherein a server-side processor determines presence of a user at the retail store based on information received from a client-side application of a mobile phone of the user in response to reception of the transmitted ultrasonic signal at the mobile phone of the user, wherein the server-side processor provides the user a reward for presence in the retail store via the client-side application of the mobile phone of the user while the user is present at the retail store, and wherein the server-side processor facilitates varying the identifier transmitted by the transducer according to a schedule.

25. The system of claim 24, wherein the ultrasonic transducer is a piezoelectric transducer.

26. The system of claim 24, wherein the signal generator includes a programmable processor, wherein the programmable processor is configured to generate a waveform corresponding to the identifier.

27. The system of claim 24, wherein the signal generator includes a memory, wherein the memory stores data relating to a waveform corresponding to the identifier.

28. The system of claim 24, further comprising an encryptor configured to encrypt the identifier.

29. The system of claim 24, further comprising a real-time clock.

30. The system of claim 24, further comprising a time-varying component generator, wherein the identifier includes a time-varying component generated by the time-varying component generator.

31. The system of claim 24, further comprising a time receiver.

32. The system of claim 24, wherein the identifier further identifies a department within the retail store.

33. The system of claim 24, wherein the identifier is associated with a received component received by a network interface.

34. The system of claim 26, wherein the processor is further configured to receive a challenge, and respond to the challenge.

35. The system of claim 24, wherein the signal generator is configured to generate the identifier using frequency shift keying.

36. The system of claim 24, wherein the signal generator is configured to generate the identifier using phase shift keying.

37. The system of claim 24, wherein the signal generator is configured to generate the identifier using amplitude shift keying.

38. The system of claim 24, wherein the signal generator is configured to generate the identifier using multifrequency signaling.

39. The system of claim 38, wherein the multifrequency signaling includes spread spectrum communications.

40. The system of claim 24, further comprising an error correcting code generator, wherein the identifier includes an error correcting code, and wherein the error correcting code generator is configured to calculate the error correcting code from a source data.

41. The system of claim 40, wherein the error correcting code is a turbo code.

42. The system of claim 40, wherein the error correcting code is a convolutional code.

43. The system of claim 40, wherein the error correcting code is a Reed-Solomon code.

44. The system of claim 24, further comprising an error detecting code generator, wherein the identifier includes an error detecting code, wherein the error detecting code generator is configured to calculate the error detecting code from a source data.

45. The system of claim 44, wherein the error detecting code includes a cyclic redundancy check.

46. A method, comprising:
generating an identifier that identifies a retail store; and
transmitting the identifier in the retail store using a signal transmitter that transmits using Bluetooth;
wherein a server-side processor determines presence of a user at the retail store based on information received from a client-side application of a mobile phone of the user in response to reception of the transmitted Bluetooth signal at the mobile phone of the user, wherein the server-side processor provides the user a reward for presence in the retail store via the client-side application of the mobile phone of the user while the user is present at the retail store, and wherein the server-side processor facilitates varying the identifier transmitted by the transmitter according to a schedule.

47. The method of claim 46, further comprising encrypting the identifier.

48. The method of claim 46, wherein the identifier includes a time-varying component.

49. The method of claim 48, further comprising controlling the time-varying component using a real time clock.

50. The method of claim 48, further comprising receiving a broadcast time signal to control the time-varying component.

51. The method of claim 48, wherein the time-varying component includes a nonce.

52. The method of claim 48, wherein the time-varying component includes a timestamp.

53. The method of claim 48, wherein the time-varying component includes a rotating key.

54. The method of claim 46, wherein the identifier further identifies a department within the retail store.

55. The method of claim 46, wherein the identifier is associated with a component received from the server-side processor.

56. The method of claim 46, wherein the identifier includes an error correcting code calculated from a source data.

57. The method of claim 56, wherein the error correcting code is a turbo code.

58. The method of claim 56, wherein the error correcting code is a convolutional code.

59. The method of claim 56, wherein the error correcting code is a Reed-Solomon code.

60. The method of claim 46, wherein the identifier includes an error detecting code calculated from a source data.

61. The method of claim 60, wherein the error detecting code includes a cyclic redundancy check.

* * * * *